US007006442B1

(12) United States Patent
Abe et al.

(10) Patent No.: US 7,006,442 B1
(45) Date of Patent: Feb. 28, 2006

(54) COMMUNICATION CONTROL SYSTEM AND CONTROL METHOD THEREOF

(75) Inventors: Shinji Abe, Tokyo (JP); Shinji Ueno, Tokyo (JP)

(73) Assignee: NEC Corporation, Tokyo (JP)

( * ) Notice: Subject to any disclaimer, the term of this patent is extended or adjusted under 35 U.S.C. 154(b) by 970 days.

(21) Appl. No.: 09/717,293

(22) Filed: Nov. 22, 2000

(30) Foreign Application Priority Data

Nov. 25, 1999 (JP) ................................. 11-333741

(51) Int. Cl.
  *H04L 12/56* (2006.01)
  *G06F 13/00* (2006.01)
(52) U.S. Cl. ..................... 370/236; 370/409; 370/469; 709/232
(58) Field of Classification Search ................ 370/230, 370/231, 235, 236, 389, 395.1, 395.2, 395.4, 370/395.41, 395.42, 396, 397, 400, 401, 370/409, 412, 463, 469, 522; 709/224, 232, 709/238, 250
See application file for complete search history.

(56) References Cited

U.S. PATENT DOCUMENTS

| 5,029,164 | A | * | 7/1991 | Goldstein et al. | ........... 370/235 |
| 5,187,708 | A | * | 2/1993 | Nakatani et al. | ............ 370/469 |
| 5,303,344 | A | * | 4/1994 | Yokoyama et al. | ......... 709/230 |
| 5,379,297 | A | * | 1/1995 | Glover et al. | ................ 370/234 |
| 5,751,709 | A | * | 5/1998 | Rathnavelu | ............... 370/395.4 |
| 5,751,951 | A | * | 5/1998 | Osborne et al. | ............ 709/250 |
| 5,841,772 | A | * | 11/1998 | Daniel et al. | ............. 370/395.4 |
| 5,936,956 | A | * | 8/1999 | Naven | ...................... 370/395.7 |
| 6,064,674 | A | * | 5/2000 | Doidge et al. | .............. 370/398 |
| 6,208,661 | B1 | * | 3/2001 | Marshall | ...................... 370/412 |

FOREIGN PATENT DOCUMENTS

| JP | 6-197146 A | 7/1994 |
| JP | 9-55755 A | 2/1997 |
| JP | 9-204376 | 9/1997 |
| JP | 9-247211 A | 9/1997 |
| JP | 10-276221 A | 10/1998 |

* cited by examiner

*Primary Examiner*—Alpus H. Hsu
(74) *Attorney, Agent, or Firm*—Sughrue Mion, PLLC

(57) ABSTRACT

In a communication control system for controlling packet transfer conducted by a plurality of logical channels between nodes, a circuit is provided for recording, in a descriptor for recording information regarding transfer by each logical channel, information including a stop bit, an activation bit, the number of logical channel to be activated, an identification value, the number of logical channel to be monitored and a monitoring identification value which are information regarding the order of transfer by each logical channel, and a data link layer includes a circuit for executing transfer by each logical channel based on the order of transfer by each logical channel designated by a descriptor.

56 Claims, 10 Drawing Sheets

COMMUNICATION CONTROL SYSTEM AND CONTROL METHOD THEREOF

BACKGROUND OF THE INVENTION

1. Field of the Invention

The present invention relates to a communication control system for controlling packet transfer conducted by a plurality of logical channels and, more particularly, to a communication control system for conducting sequential processing and synchronous processing of transmission data at a high speed.

2. Description of the Related Art

In a communication control device for providing communication between nodes connected by a virtual channel protocol, at the time of conducting message transfer and data transfer between nodes by using packets, a logical channel is set up between the nodes by a management layer in charge of transfer control and, a descriptor which records information for transmission and reception is prepared for each packet transfer to activate a transmission and reception control circuit.

Although the descriptor is analyzed by a data link layer of the communication control device, packet transfer is conducted independently for each logical channel in a conventional device, so that logical channels are independent of each other.

Therefore, in a case where sequential or synchronous transfer processing is required between a plurality of logical channels, a management layer realized by higher-order software etc. monitors the end of packet transfer by such a waiting system as polling or interruption and after receiving a notification of the end of transfer, causes other logical channel to activate transfer.

Here, description will be made of sequential processing and synchronous processing by a conventional communication control system.

FIG. 9 is a flow chart for use in explaining sequential processing by a conventional communication control system, with reference to which description will be made with respect to sequential processing of sequentially transferring two packets, a first packet and a second packet as an example.

With reference to FIG. 9, in the sequential processing of transferring the two packets, first, a higher-order management layer transfers a descriptor of the first packet to the communication control device, a data link layer transfers the first packet by a logical channel of the logical channel number "1" (Step 901) and the management layer waits for transfer confirmation by polling, interruption or the like to confirm the transfer (Step 902). The management layer again transfers a descriptor of the second packet to the communication control device, the data link layer transfers the second packet by a logical channel of the logical channel number "2" (Step 903) and the management layer again waits for transfer confirmation to confirm transfer (Step 904) to result in normal end. When an error occurs at each of the Steps 902 and 904, the routine proceeds to error processing.

As described in the foregoing, since in conventional sequential processing, a higher-order management layer confirms transfer at every packet transfer, a large overhead is generated such as consumption of CPU resources by polling and a delay caused by notification of an interruption and the subsequent confirmation thereof.

The numbers "1" and "2", of the logical channels are here recited as an example. The reason the different logical channels are used for the first packet and the second packet is that in a case, as the simplest example, where the processing of continuously transferring packets by using the logical channel number "1" is to be executed after the first packet without waiting for a result, if the second packet uses the same logical channel number "1", transfer of the second packet is kept waiting until the result is obtained because of the policy of a scheduler.

FIG. 10 is a flow chart for use in explaining synchronous processing of a plurality of packets by a plurality of logical channels by a conventional communication control system, with reference to which description is made as an example with respect to synchronous processing of simultaneously transferring two packets, a second packet and a third packet after the transfer of a first packet is completed.

With reference to FIG. 10, in the synchronous processing of the two packets, first, a higher-order management layer transfers a descriptor of the first packet to a communication control device, a data link layer transfers the first packet by a logical channel of the logical channel number "1" (Step 1001) and the management layer waits for transfer confirmation by polling, interruption or the like to confirm the transfer (Step 1001). Subsequently, the management layer transfers descriptors of the second packet and the third packet to the communication control device, the data link layer transfers the second packet by the logical channel number "2" (Step 1003) and then the third packet by the logical channel number "3" (Step 1004) and the management layer waits for confirmation of transfer of the two packets to confirm the transfer (Step 1005) to result in normal end. When an error occurs at each of the Steps 1002 and 1005, the routine proceeds to error processing.

As described in the foregoing, also in conventional synchronous processing, transfer is confirmed by a higher-order management layer at every packet transfer and a time lag is generated in transferring a descriptor to the communication device (Steps 1002 to 1003) to cause a large overhead.

In recent years, in the field of communication means for conducting packet communication, there appear a communication device and a communication means employing such an extremely high speed medium as optical communication using an optical cable including GigaBit Ether.

However, communication control systems operating these communication devices fail to fully make use of a capacity of high-speed media.

Main reason is overhead between a management layer realized by software and a data link layer realized by a communication device.

In a computer network, between a communication application as software and a communication device as hardware, there exist numerous software stacks, and overhead therebetween hinders improvement in communication performance.

Generation of the overhead is caused because as illustrated in the above-described examples of the sequential control and synchronous control in FIGS. 9 and 10, even in a case of transmitting each packet according to predetermined rules, a higher-order management layer transfers a descriptor to a communication device every time each packet is to be transferred and after the transmission, confirms the transfer.

Demanded is a system in which a data link layer takes charge of such processing as sequential transmission of each packet and a higher-order management layer transfers data to be transmitted together with information including the order of the transmission thereof to a communication device in the lump.

One of conventional techniques of making a data link layer execute processing which is ordinarily conducted by a higher-order management layer is the art disclosed in Japanese Patent Laying-Open (Kokai) No. Heisei 9-204376. According to the technique, information about a destination of transfer data which a higher-order management layer transfers to a communication device is described in a form unique to a system and converted into an ordinary address on a network by a data link layer. The conventional technique, however, is intended not to reduction in overhead between a data link layer and a management layer but to distributional processing of communication address management and fails to cope with high-speed sequential processing and synchronous processing of transmission data. Moreover, for making the data link layer to execute complicated processing of address management, complicated device structure is required.

SUMMARY OF THE INVENTION

An object of the present invention is to eliminate the above-described shortcomings of conventional techniques and to provide a communication processing system which enables processing of sequential control, synchronous control, etc. conventionally requiring intervention of processing by a higher-order management layer to be executed at a high speed by a data link layer and also realizes the high-speed processing without requiring the data link layer to have complicated functions and processing.

According to the first aspect of the invention, a communication control system having a data link layer which executes data transfer on a logical channel for controlling packet transfer conducted by a plurality of the logical channels, comprises means for recording, in a descriptor for recording information regarding transfer by each logical channel, information including information regarding the order of transfer by each the logical channel, wherein the data link layer includes means for executing transfer by each the logical channel based on the order of transfer by each the logical channel designated by the descriptor.

In the preferred construction, the descriptor has a stop bit indicating that transfer by the logical channel in question is not to be executed immediately but to be started on condition that transfer by other logical channel designated is completed, and the data link layer includes means for temporarily stopping transfer processing by the logical channel having the stop bit recorded in the descriptor to wait for the transfer starting condition to be fulfilled.

In another preferred construction, the descriptor has an activation bit indicating that completion of transfer by the logical channel in question is set to be a transfer starting condition for other logical channel designated, and the data link layer includes means for monitoring the completion of transfer by the logical channel having the activation bit recorded in the descriptor to determine fulfillment of the transfer starting condition for the other logical channel designated upon the completion of the transfer.

In another preferred construction, the descriptor has a number of logical channel to be activated for specifying other designated logical channel having the completion of transfer by the logical channel in question set to be a transfer starting condition, and the data link layer includes means for monitoring the completion of transfer by the logical channel having the number of logical channel to be activated recorded in the descriptor to determine fulfillment of the transfer starting condition for a logical channel indicated by the number of logical channel to be activated upon the completion of the transfer of the logical channel.

In another preferred construction, the descriptor has an activation bit indicating that completion of transfer by the logical channel in question is set to be a transfer starting condition for other logical channel designated, a stop bit indicating that transfer by the logical channel in question is not to be executed immediately but to be started on condition that transfer by other logical channel designated is completed, and a number of logical channel to be activated for specifying other designated logical channel having the completion of transfer by the logical channel in question set to be a transfer starting condition, and the data link layer includes means for temporarily stopping transfer processing by the logical channel having the stop bit recorded in the descriptor to wait for the transfer starting condition to be fulfilled, means for monitoring the completion of transfer by the logical channel having the activation bit recorded in the descriptor to determine fulfillment of the transfer starting condition for the other logical channel designated upon the completion of the transfer, and means for monitoring the completion of transfer by the logical channel having the number of logical channel to be activated recorded in the descriptor to determine fulfillment of the transfer starting condition for a logical channel indicated by the number of logical channel to be activated upon the completion of the transfer of the logical channel.

In another preferred construction, the descriptor has a number of logical channel to be monitored for, in order to monitor the completion of transfer by other designated logical channel which is set to be a transfer starting condition for the logical channel in question, specifying the designated other logical channel to be monitored, and the data link layer includes means for temporarily stopping transfer by the logical channel having the number of logical channel to be monitored recorded in the descriptor and monitoring the completion of transfer by a logical channel indicated by the number of logical channel to be monitored to determine fulfillment of the transfer starting condition for the logical channel in question upon the completion of the transfer.

In another preferred construction, the descriptor has an activation bit indicating that completion of transfer by the logical channel in question is set to be a transfer starting condition for other logical channel designated, a number of logical channel to be activated for specifying other designated logical channel having the completion of transfer by the logical channel in question set to be a transfer starting condition, and a number of logical channel to be monitored for, in order to monitor the completion of transfer by other designated logical channel which is set to be a transfer starting condition for the logical channel in question, specifying the designated other logical channel to be monitored, and the data link layer includes means for monitoring the completion of transfer by the logical channel having the activation bit recorded in the descriptor to determine fulfillment of the transfer starting condition for the other logical channel designated upon the completion of the transfer, means for monitoring the completion of transfer by the logical channel having the number of logical channel to be activated recorded in the descriptor to determine fulfillment of the transfer starting condition for a logical channel indicated by the number of logical channel to be activated upon the completion of the transfer of the logical channel, and means for temporarily stopping transfer by the logical channel having the number of logical channel to be monitored recorded in the descriptor and monitoring the completion of transfer by a logical channel indicated by the number of logical channel to be monitored to determine fulfillment of the transfer starting condition for the logical channel in question upon the completion of the transfer.

In another preferred construction, the descriptor has an activation bit indicating that completion of transfer by the logical channel in question is set to be a transfer starting condition for other logical channel designated, a stop bit indicating that transfer by the logical channel in question is not to be executed immediately but to be started on condition that transfer by other logical channel designated is completed, a number of logical channel to be activated for specifying other designated logical channel having the completion of transfer by the logical channel in question set to be a transfer starting condition, and a number of logical channel to be monitored for, in order to monitor the completion of transfer by other designated logical channel which is set to be a transfer starting condition for the logical channel in question, specifying the designated other logical channel to be monitored, and the data link layer includes means for temporarily stopping transfer processing by the logical channel having the stop bit recorded in the descriptor to wait for the transfer starting condition to be fulfilled, means for monitoring the completion of transfer by the logical channel having the activation bit recorded in the descriptor to determine fulfillment of the transfer starting condition for the other logical channel designated upon the completion of the transfer, means for monitoring the completion of transfer by the logical channel having the number of logical channel to be activated recorded in the descriptor to determine fulfillment of the transfer starting condition for a logical channel indicated by the number of logical channel to be activated upon the completion of the transfer of the logical channel, and means for temporarily stopping transfer by the logical channel having the number of logical channel to be monitored recorded in the descriptor and monitoring the completion of transfer by a logical channel indicated by the number of logical channel to be monitored to determine fulfillment of the transfer starting condition for the logical channel in question upon the completion of the transfer.

In another preferred construction, the descriptor has an identification value and a monitoring identification value as numerical data, and the data link layer includes means for comparing, at the time of determination of the transfer starting condition, a value of the monitoring identification value of the descriptor of a waiting logical channel which is a logical channel on the side waiting for the transfer starting condition to be fulfilled and a value of the identification value of a preceding logical channel which is a logical channel on the side which conducts transfer prior to the waiting logical channel and whose transfer completion is the transfer starting condition for the waiting logical channel to determine fulfillment of the transfer starting condition only when the value of the monitoring identification value and the value of the identification value are equal.

In another preferred construction, the descriptor has an activation bit indicating that completion of transfer by the logical channel in question is set to be a transfer starting condition for other logical channel designated, a stop bit indicating that transfer by the logical channel in question is not to be executed immediately but to be started on condition that transfer by other logical channel designated is completed, a number of logical channel to be activated for specifying other designated logical channel having the completion of transfer by the logical channel in question set to be a transfer starting condition, and an identification value and a monitoring identification value as numerical data, and the data link layer includes means for temporarily stopping transfer processing by the logical channel having the stop bit recorded in the descriptor to wait for the transfer starting condition to be fulfilled, means for monitoring the completion of transfer by the logical channel having the activation bit recorded in the descriptor to determine fulfillment of the transfer starting condition for the other logical channel designated upon the completion of the transfer, means for monitoring the completion of transfer by the logical channel having the number of logical channel to be activated recorded in the descriptor to determine fulfillment of the transfer starting condition for a logical channel indicated by the number of logical channel to be activated upon the completion of the transfer of the logical channel, and means for comparing, at the time of determination of the transfer starting condition, a value of the monitoring identification value of the descriptor of a waiting logical channel which is a logical channel on the side waiting for the transfer starting condition to be fulfilled and a value of the identification value of a preceding logical channel which is a logical channel on the side which conducts transfer prior to the waiting logical channel and whose transfer completion is the transfer starting condition for the waiting logical channel to determine fulfillment of the transfer starting condition only when the value of the monitoring identification value and the value of the identification value are equal.

In another preferred construction, the descriptor has a number of logical channel to be monitored for, in order to monitor the completion of transfer by other designated logical channel which is set to be a transfer starting condition for the logical channel in question, specifying the designated other logical channel to be monitored, and an identification value and a monitoring identification value as numerical data, and the data link layer includes means for temporarily stopping transfer by the logical channel having the number of logical channel to be monitored recorded in the descriptor and monitoring the completion of transfer by a logical channel indicated by the number of logical channel to be monitored to determine fulfillment of the transfer starting condition for the logical channel in question upon the completion of the transfer, and means for comparing, at the time of determination of the transfer starting condition, a value of the monitoring identification value of the descriptor of a waiting logical channel which is a logical channel on the side waiting for the transfer starting condition to be fulfilled and a value of the identification value of a preceding logical channel which is a logical channel on the side which conducts transfer prior to the waiting logical channel and whose transfer completion is the transfer starting condition for the waiting logical channel to determine fulfillment of the transfer starting condition only when the value of the monitoring identification value and the value of the identification value are equal.

According to the second aspect of the invention, a method of controlling a communication control system having a data link layer which executes data transfer on a logical channel for controlling packet transfer conducted by a plurality of the logical channels, comprising:

the step of recording, in a descriptor for recording information regarding transfer by each logical channel, information including information regarding the order of transfer by each the logical channel, and the step of the data link layer of executing transfer by each the logical channel based on the order of transfer by each the logical channel designated by the descriptor.

In the preferred construction, the method of controlling a communication control system further comprising the step of recording in the descriptor a stop bit indicating that transfer by the logical channel in question is not to be executed immediately but to be started on condition that transfer by other logical channel designated is completed, and the step of the data link layer of temporarily stopping transfer processing by the logical channel having the stop bit recorded in the descriptor to wait for the transfer starting condition to be fulfilled.

In another preferred construction, the method of controlling a communication control system further comprising the step of recording in the descriptor an activation bit indicating that completion of transfer by the logical channel in question is set to be a transfer starting condition for other logical channel designated, and the step of the data link layer of monitoring the completion of transfer by the logical channel having the activation bit recorded in the descriptor to determine fulfillment of the transfer starting condition for the other logical channel designated upon the completion of the transfer.

In another preferred construction, the method of controlling a communication control system further comprising the step of recording in the descriptor a number of logical channel to be activated for specifying other designated logical channel having the completion of transfer by the logical channel in question set to be a transfer starting condition, and the step of the data link layer of monitoring the completion of transfer by the logical channel having the number of logical channel to be activated recorded in the descriptor to determine fulfillment of the transfer starting condition for a logical channel indicated by the number of logical channel to be activated upon the completion of the transfer of the logical channel.

In another preferred construction, the method of controlling a communication control system comprising the step of recording in the descriptor a number of logical channel to be monitored for, in order to monitor the completion of transfer by other designated logical channel which is set to be a transfer starting condition for the logical channel in question, specifying the designated other logical channel to be monitored, and the step of the data link layer of temporarily stopping transfer by the logical channel having the number of logical channel to be monitored recorded in the descriptor and monitoring the completion of transfer by a logical channel indicated by the number of logical channel to be monitored to determine fulfillment of the transfer starting condition for the logical channel in question upon the completion of the transfer.

In another preferred construction, the method of controlling a communication control system comprising the step of recording in the descriptor an identification value and a monitoring identification value as numerical data, and the step of the data link layer of comparing, at the time of determination of the transfer starting condition, a value of the monitoring identification value of the descriptor of a waiting logical channel which is a logical channel on the side waiting for the transfer starting condition to be fulfilled and a value of the identification value of a preceding logical channel which is a logical channel on the side which conducts transfer prior to the waiting logical channel and whose transfer completion is the transfer starting condition for the waiting logical channel to determine fulfillment of the transfer starting condition only when the value of the monitoring identification value and the value of the identification value are equal.

According to another aspect of the invention, a computer readable memory storing a control program of a communication control system having a data link layer which executes data transfer on a logical channel for controlling packet transfer conducted by a plurality of the logical channels, the control program comprising the step of recording, in a descriptor for recording information regarding transfer by each logical channel, information including information regarding the order of transfer by each the logical channel, and the step of the data link layer of executing transfer by each the logical channel based on the order of transfer by each the logical channel designated by the descriptor.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings.

DESCRIPTION OF THE PREFERRED EMBODIMENTS

The preferred embodiment of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to unnecessary obscure the present invention.

A communication control system, at the time of transferring a message and data to a third party by using a plurality of logical channels, sets up a plurality of logical channels with a node of the third party and transmits and receives the message and the data based on information of a descriptor prepared by a management layer.

The descriptor includes a control segment in which control information is described such as the number of a logical channel and a protocol for use in communication and a data segment in which information is described regarding data itself such as an address in a storage unit which stores a message to be transferred.

In the data transfer procedure, first, a management layer designates a logical channel to transfer a descriptor to a data link layer, the data link layer subsequently analyzes the descriptor, sets up an appropriate packet and outputs a message and data to a physical layer to execute data transfer to a node of a third party, and the management layer confirms the transfer to complete the transfer.

In the communication control system of the present invention, with information including that regarding the transfer order of each logical channel recorded in a descriptor for recording information regarding transfer of each logical channel which conducts each packet transfer, a data link layer executes transfer of each logical channel based on the recorded transfer order.

This arrangement enables sequential control and synchronous control between logical channels to be conducted in the data link layer to realize high-speed and precise processing.

A communication control system according to the first embodiment of the present invention adopts a system in which recording, in a descriptor of a logical channel of the side which first conducts transfer, the number of a waiting logical channel of the side which starts transfer next after the data transfer is completed enables a data link layer to execute sequential processing of data transfer based on the information. Hereinafter, the method is referred to as a passive system.

Figure 1:
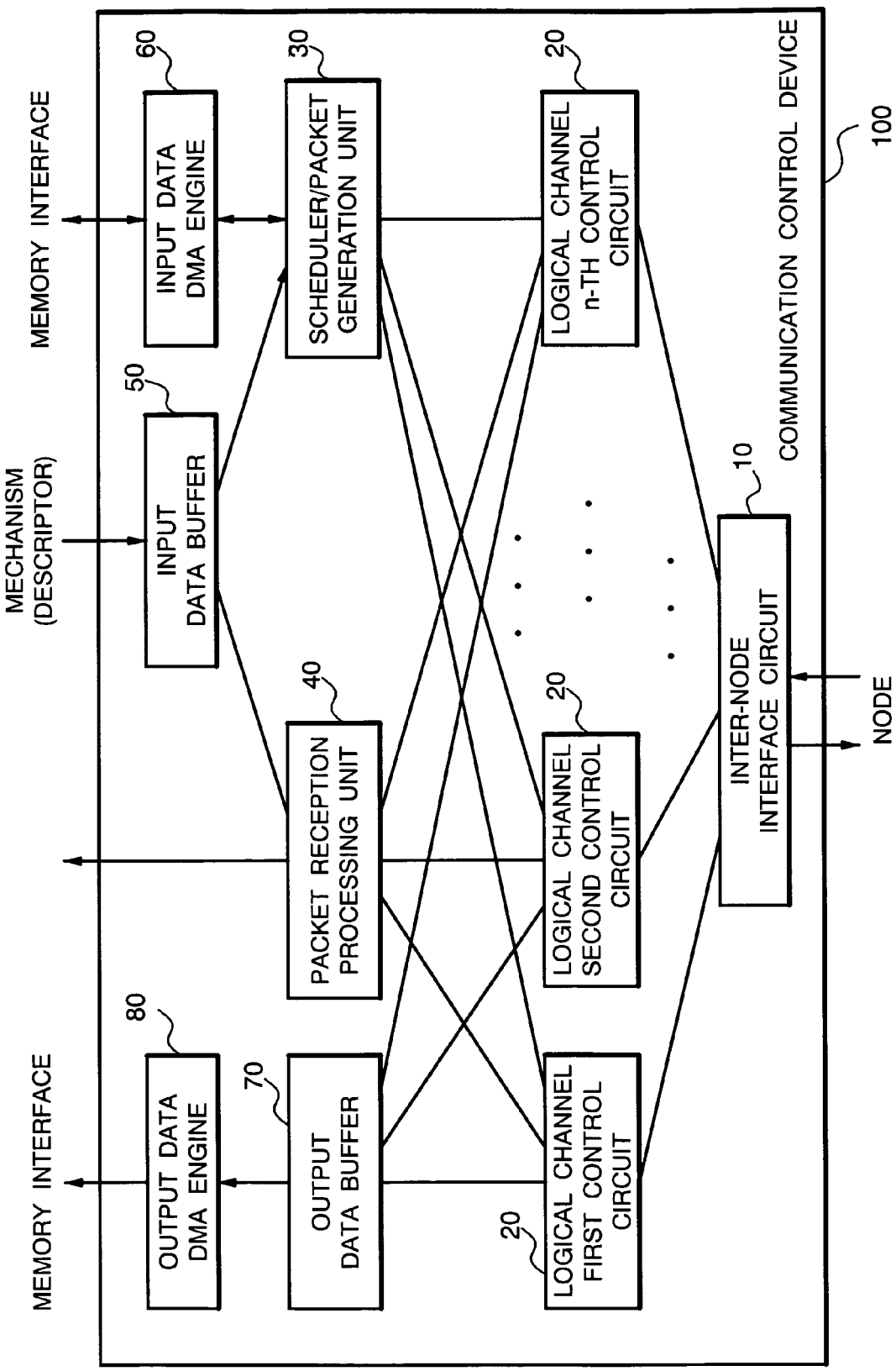
FIG. 1 is a block diagram showing a structure of a communication control system according to a first embodiment of the present invention.
Figure 2:
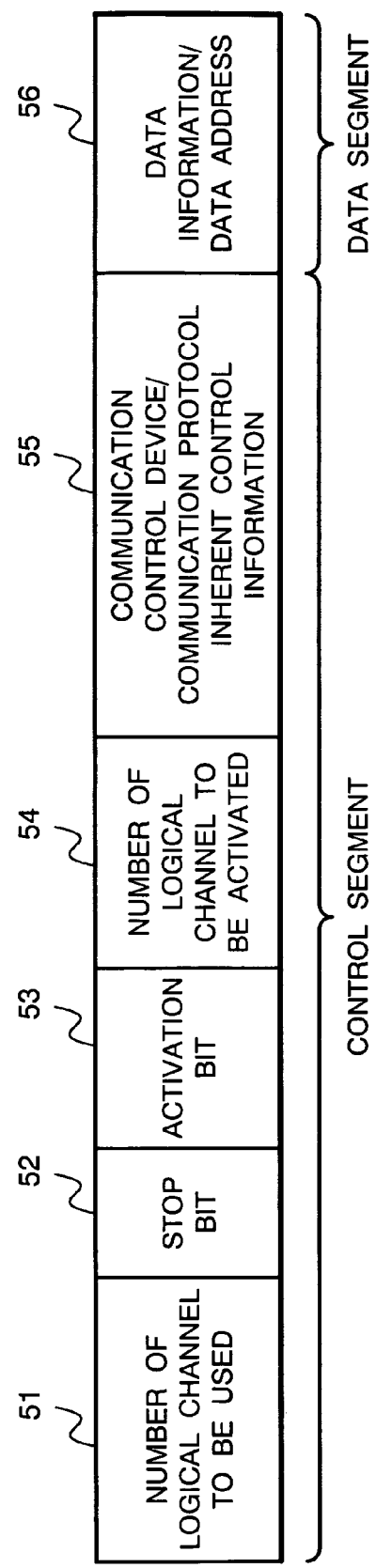
FIG. 2 is a diagram showing a format of a descriptor of the first embodiment of the present invention.

FIG. 1 is a block diagram showing a structure of a communication control system according to a first embodiment of the present invention and FIG. 2 is a diagram showing a format of a descriptor of the first embodiment of the present invention.

With reference to FIG. 2, the descriptor of the present embodiment includes a control segment in which control information of data transfer is described and a data segment in which information regarding data to be transferred is described.

The control segment includes a number of logical channel to be used 51 indicative of the number of a logical channel to be used for transfer, a stop bit 52 indicating that transfer is temporarily stopped for the synchronization with other logical channel, an activation bit 53 indicating that the transition of other designated logical channel from a temporarily stopped state to an active state is made after the completion of the transfer to activate transfer, a number of logical channel to be activated 54 indicative of the number of a logical channel to be activated, and inherent control information 55 indicative of control information inherent to a protocol and a device for use in communication control between nodes.

The data segment includes a data address 56 indicative of an address at which data information such as a length of data and data are stored.

With reference to FIG. 1, the communication control system of the present embodiment includes in a communication control device 100, an inter-node interface circuit 10, a plurality of logical channel first to n-th control devices 20, a scheduler/packet generation circuit 30, a packet reception processing unit 40, an input data buffer 50, an input data DMA (Direct Memory Access) engine 60, an output data buffer 70 and an output data DMA engine 80.

The inter-node interface 10, which provides the interface with a node of a communication partner, is equivalent to a physical layer of the communication control device.

The logical channel control circuit 20 is connected when a logical channel is set up between nodes to operate according to a procedure of communication between the nodes, that is, a communication protocol for use between the nodes such as error control and flow control. Although the system in the figure includes a number n of the first to the n-th logical channel control circuits 20, the number can be any number as long as the volume of hardware allows and when the circuit has a function of controlling a plurality of logical channels, one circuit is possible.

The input buffer 50 records each of the information 52 to 56 of the descriptor shown in FIG. 2 for each number of logical channel to be used 51. In other words, the descriptor format illustrated in FIG. 2 shows a structure of one entry to the input buffer 50.

The scheduler/packet generation unit 30 has a function of scheduling descriptors basically in the order of their application to the input buffer 50 to activate the input data DMA engine 60 based on control segment information stored in the input buffer 50 and a data address 56 of the data segment and generating a packet from the main body of data transferred from a memory to ultimately allocate the packet to the logical channel circuit 20 indicated by the number of logical channel to be used 51.

In addition, when the stop bit 52 is set at the control segment, the packet transfer is temporarily stopped and the unit 30 refrains from generation of a packet and allocation of the same to the relevant logical channel control circuit 20.

The packet reception processing unit 40 receives a data packet, a transmission confirmation notification packet or an error notification packet from a node of a partner and when confirming by the transmission confirmation notification packet that data transfer is normally conducted, notifies a higher-order management layer of the completion of the packet processing, as well as checking a descriptor control segment of a relevant logical channel in the input buffer 50 and when the activation bit 53 is set, resetting the stop bit 52 of a logical channel indicated by the number of logical channel to be activated 54 to release the temporarily stopped state and put the logical channel to the active state. When receiving the error notification packet, the unit 40 gives an error notification to the higher-order management layer through interruption etc.

Data transferred from the partner's node is multiplexed with an output of the logical channel control circuit 20 and stored in the output data buffer 70 and then stored in the memory through the output DMA engine 80. At this time, data packet reception is notified to the higher-order management layer through the packet reception processing unit 40 to notify data arrival.

Figure 3:
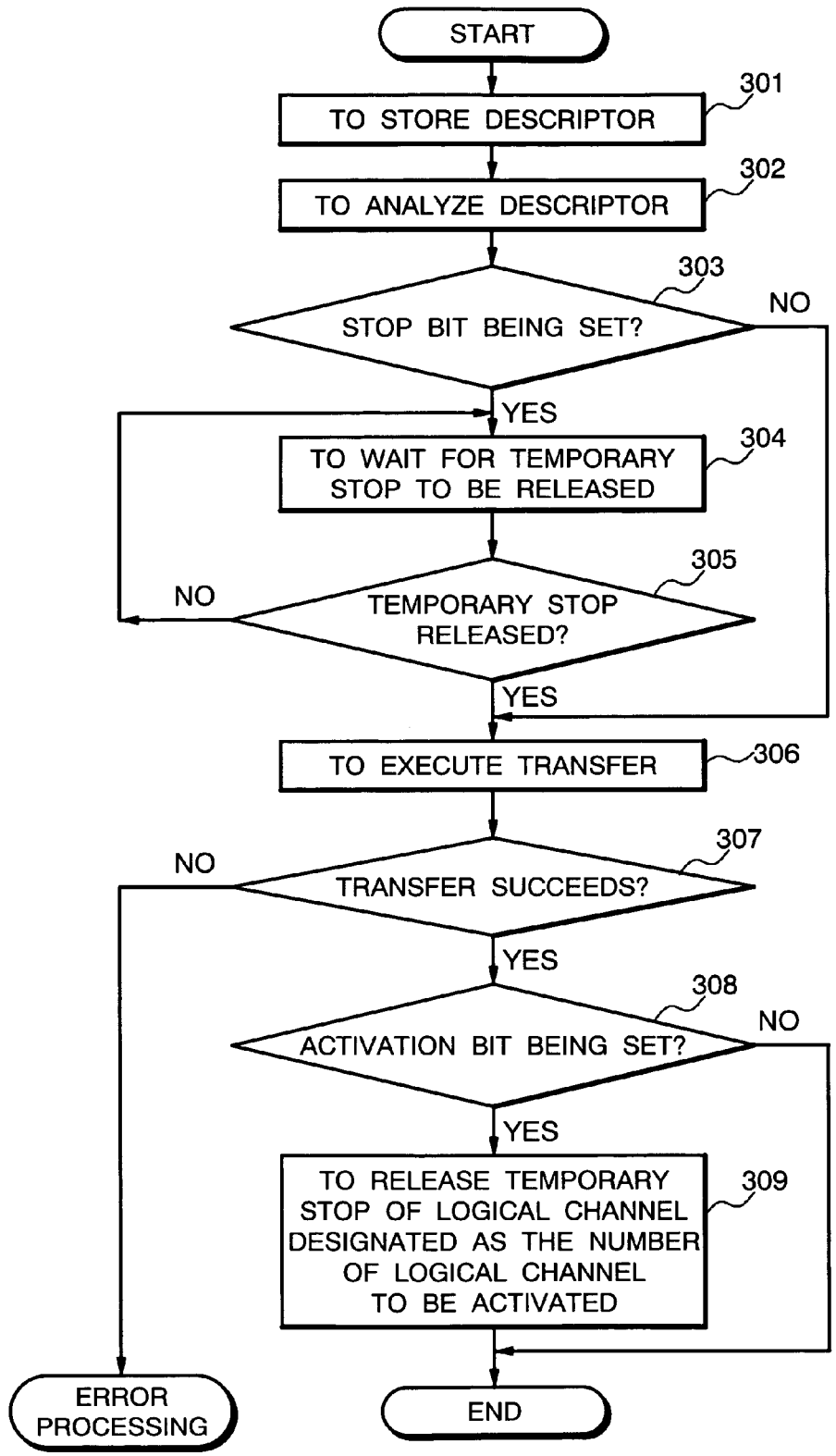
FIG. 3 is a flow chart for use in explaining processing of communication control according to the first embodiment of the present invention.

FIG. 3 is a flow chart for use in explaining processing of (passive system) communication control according to the first embodiment of the present invention.

With reference to FIG. 3, in the processing of the passive system communication control according to the present embodiment, first, a descriptor is stored in the input data buffer 50 (Step 301) and the scheduler/packet generation unit 30 analyzes information of the stored descriptor (Step 302).

Here, in a case where the stop bit 52 is recorded in the descriptor (the stop bit 52 is ON), temporarily stop transfer of a packet indicated by the descriptor (Step 303) and wait for release of the temporary stop (Step 304) to execute transfer after the temporary stop is released (Steps 305 and 306).

On the other hand, in a case where the stop bit 52 is not recorded in the descriptor (the stop bit 52 is OFF), start the transfer immediately (Steps 303 and 306).

In a case where the transfer succeeds, the activation bit 53 recorded in the descriptor (the activation bit 53 is ON) represents that there exists other logical channel being currently at the temporarily stopped state which is to be transferred after the present transfer is completed, and the number of logical channel to be activated 54 indicates such a logical channel. In this case, therefore, release the temporary stop of a logical channel indicated by the number of logical channel to be activated 54 to start the transfer (Steps 308 and 309) and end the transfer processing by the logical channel.

On the other hand, in a case of transfer success, if the activation bit 53 is yet to be recorded in the descriptor (the activation bit 53 is OFF), end the transfer processing by the logical channel.

When data transfer at Step 307 fails, execute error processing and in this case, even if the activation bit 53 is recorded, no release of temporary stop of other logical channel is conducted.

Next, processing of the present embodiment will be described with respect to a specific case as an example.

Figure 4:
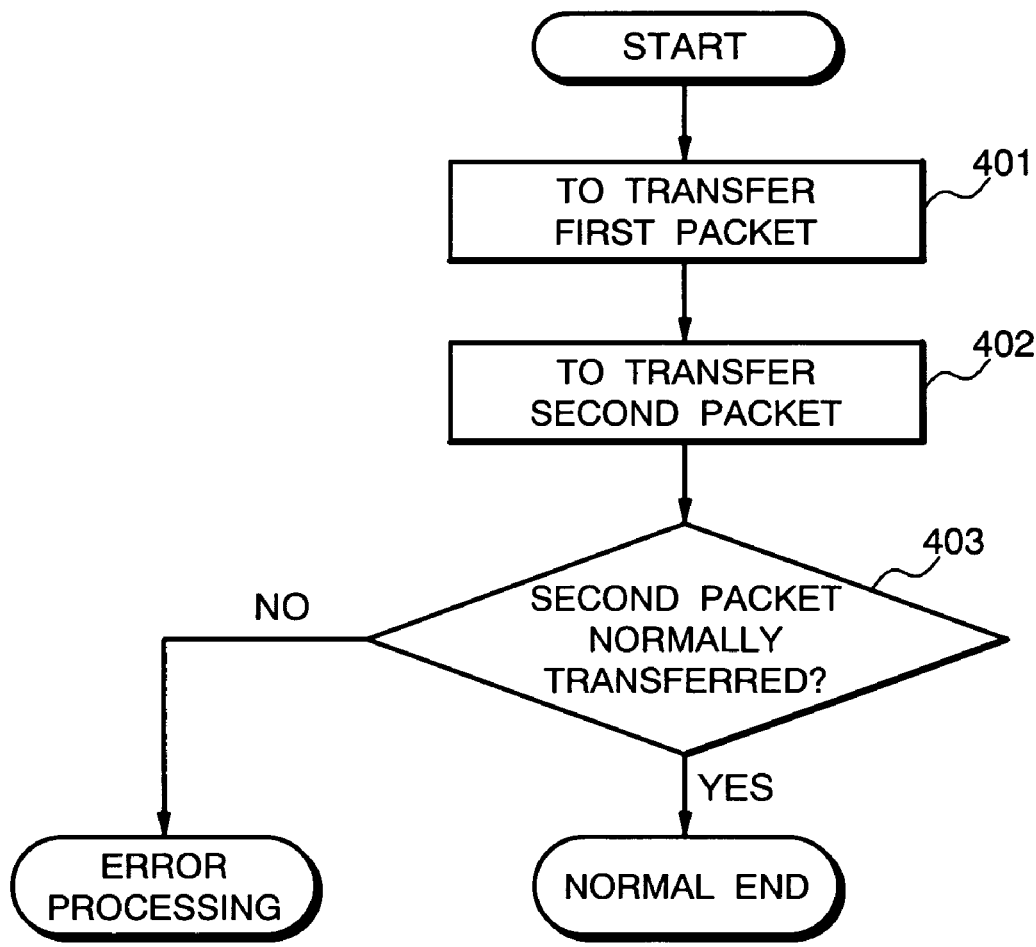
FIG. 4 is a flow chart for use in explaining sequential processing conducted by the communication control system according to the first embodiment of the present invention.

FIG. 4 is a flow chart for use in explaining sequential processing by the communication control system according the first embodiment of the present invention, which shows an example of the simplest sequential processing of transferring a second packet after a first packet is transferred and normal end thereof is confirmed.

With reference to FIG. 4, according to the passive system of the present embodiment, after the first packet is transferred by the logical channel number "1" (Step 401), the second packet can be subsequently transferred by the logical channel number "2" without waiting for the result (Step 402) to lead to normal end after waiting for only an ultimate result (Step 403).

The foregoing procedure enables more reduction of overhead for the confirmation of transfer as compared with that by a conventional technique. Although the simplest case is shown as an example here, the more the steps of the sequential processing are, the more effects the processing can achieve.

The passive system sequential processing in the example shown in FIG. 4 will be described in more detail.

Assume in the following description that the first packet is transferred by a logical channel with the logical channel number "1" under the control of the logical channel first control circuit and that the corresponding descriptor is the descriptor A. Similarly, assume that the second packet is transferred by a logical channel with the logical channel number "2" under the control of the logical channel second control circuit and that the corresponding descriptor is the descriptor B.

First, with the activation bit 53 of the descriptor illustrated in FIG. 2 set in order to activate the second packet after normal transfer is completed and with the number of logical channel to be activated 54 set to be "2" for use by the second packet, the descriptor A of the first packet is transferred to the communication control device.

Since the second packet is temporarily stopped until the end of transfer of the first packet, with the stop bit 52 of the descriptor illustrated in FIG. 2 set, the descriptor B is transferred to the communication control device.

These descriptors A and B are stored in the input buffer 50.

Next, the scheduler/packet generation unit 30, in order to schedule descriptors basically in the order of their application to the input buffer 50, first generates a packet based on the descriptor A and allocates the packet to the relevant logical channel first control circuit 20.

Since the descriptor B has the stop bit 52 of the control segment set, packet transfer is temporarily stopped and the unit 30 refrains from generation of a packet and allocation thereof to a logical channel control circuit.

Thereafter, when a notification of a transmission confirmation packet for the first packet is made by the partner's node, the packet is notified to the packet reception processing unit 40 through the inter-node interface 10 and the logical channel first control circuit 20.

By checking a control segment of a descriptor having the logical channel number "1" corresponding to the first control circuit 20 in the input buffer, the packet reception processing unit 40 confirms the activation bit 53 being set and then recognizes data of the logical channel number "2" at the number of logical channel to be activated 54.

Furthermore, the packet reception processing unit 40 resets the stop bit 52 of a control segment of a descriptor having the logical channel number "2". As a result, temporary stop of the descriptor B for transferring the second packet using the logical channel number "2" is released and a packet is generated by the scheduler/packet generation unit 30 and allocated to the logical channel second control circuit, so that the second packet is transferred to the transfer destination node. In the preceding transfer of the first packet, when an error notification packet is transferred from the partner's node, the packet reception processing unit 40 gives an error notification to the higher-order management layer by interruption or the like.

As described in the foregoing, the communication control system of the present embodiment enables management of the order of transfer between logical channels and the like to be conducted by a data link layer without intervention of a higher-order management layer, thereby executing processing such as packet sequential transfer at a high speed without useless processing.

In addition, the communication control system of the present embodiment realizes the above-described effects not by burdening a data link layer with processing of a higher-order management layer but by such processing suitable for the data link layer as monitoring of transfer end and reference to and updating of data of a descriptor.

Next, second embodiment of the present invention will be described.

A communication control system of the second embodiment of the present invention adopts a system in which in a descriptor of a logical channel of the side conducting transfer after temporary stop, the number of a logical channel of the side starting the preceding transfer whose transfer completion is a condition of the release of the temporary stop is recorded and a data link layer executes sequential processing of data transfer based on thus obtained information. Hereinafter, this system is referred to as an active system.

Figure 5:
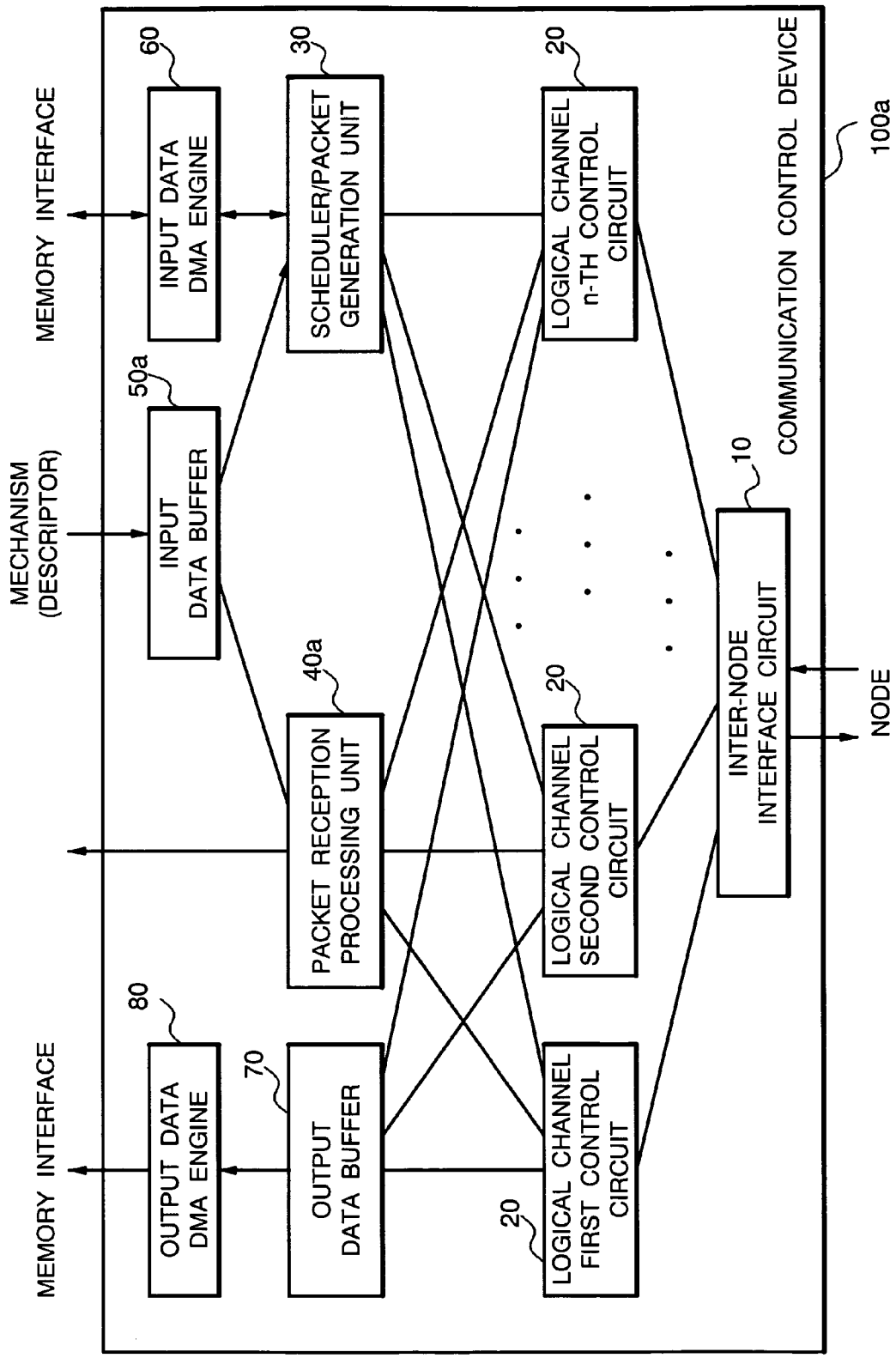
FIG. 5 is block diagram showing a structure of a communication control system according to a second embodiment of the present invention.
Figure 6:
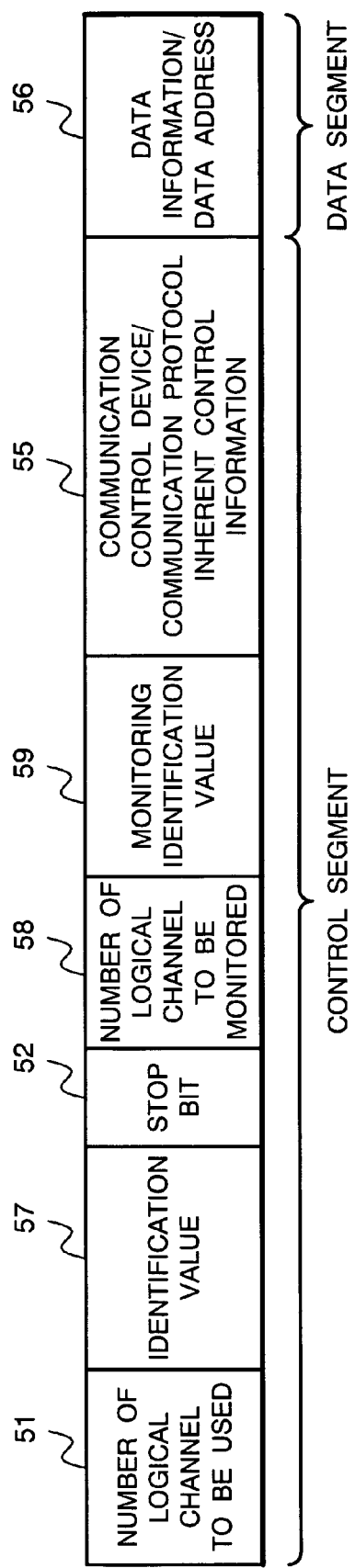
FIG. 6 is a diagram showing a format of a descriptor according to the second embodiment of the present invention.

FIG. 5 is a block diagram showing a structure of the communication control system according to the second embodiment of the present invention, while FIG. 6 is a diagram showing a format of a descriptor according to the second embodiment of the present invention.

With reference to FIG. 6, similarly to the first embodiment, the descriptor of the present embodiment includes a control segment in which control information on data transfer is described and a data segment in which information regarding data to be transferred is described.

The difference from the first embodiment resides in that the activation bit 53 and the number of logical channel to be activated 54 are not required and a number of logical channel to be monitored 58 which is the number of a logical channel which conducts the preceding transfer and whose normal end is to be monitored is provided, and the present embodiment includes an identification value 57 as a unique value in a logical channel for identifying a descriptor and includes a monitoring identification value 59 for similarly specifying a descriptor of other logical channel.

This is because data indicative of a correlation between a side conducting the preceding transfer and a waiting side which is held in a descriptor of the waiting side is recorded by using the number of logical channel to be monitored 58 and the side conducting the preceding transfer executes none of the processing of the first embodiment for the waiting side, so that there is no need of the activation bit 53 and the number of logical channel to be activated 54.

With respect to the identification value 57 and the monitoring identification value 59, the identification value 57 is recorded in a descriptor of the side conducting the preceding transfer and the monitoring identification value 59 is recorded in a descriptor of the waiting side and at the end of transfer by the side conducting the preceding transfer, data of the identification value 57 and the monitoring identification value 59 are compared to each other to release temporary stop of the waiting side only when they are equal. This enables correspondence between the side conducting the preceding transfer and the waiting side to be precisely determined.

An example of a structure of an active system communication control device 10a according to the present embodiment shown in FIG. 5 is the same as that of the passive system shown in FIG. 1, with the only difference being that the function of a packet reception processing unit 40a and the contents of a descriptor stored in an input buffer 50a are modified as described above with reference to FIG. 6. In the following, no description will be made of the same functions as those of the passive system according to the first embodiment.

The input buffer 50a records each of the information 52 to 59 of the descriptor shown in FIG. 6 for each number of logical channel to be used 51. In other words, the descriptor format illustrated in FIG. 6 shows a structure of one entry to the input buffer 50a.

The scheduler/packet generation unit 30 has a function of scheduling descriptors basically in the order of their application to the input buffer 50a to activate the input data DMA engine 60 based on control segment information and a data address 56 of the data segment stored in the input buffer 50a and generating a packet from the main body of data transferred from a memory to ultimately allocate the packet to the logical channel circuit 20 indicated by the number of logical channel to be used 51.

In addition, when the stop bit 52 is set at the control segment, the packet transfer is temporarily stopped and the unit 30 refrains from generation of a packet and allocation of the same to the relevant logical channel control circuit 20.

The packet reception processing unit 40a receives a data packet, a transmission confirmation notification packet or an error notification packet from a node of a partner and when confirming by the transmission confirmation notification packet that data transfer is normally conducted, notifies a higher-order management layer of the completion of the packet processing, as well as searching all the descriptors stored in the input buffer 50a for the number of logical channel to be monitored 58 and the monitoring identification value 59 to find a descriptor whose values coincide with the number of logical channel to be used 51 and the identification value 57 of the descriptor of the packet whose transfer is completed. When there exists a coincident descriptor, reset the stop bit 52 of the control segment of the relevant descriptor to release the temporarily stopped state and enter the active state.

Figure 7:
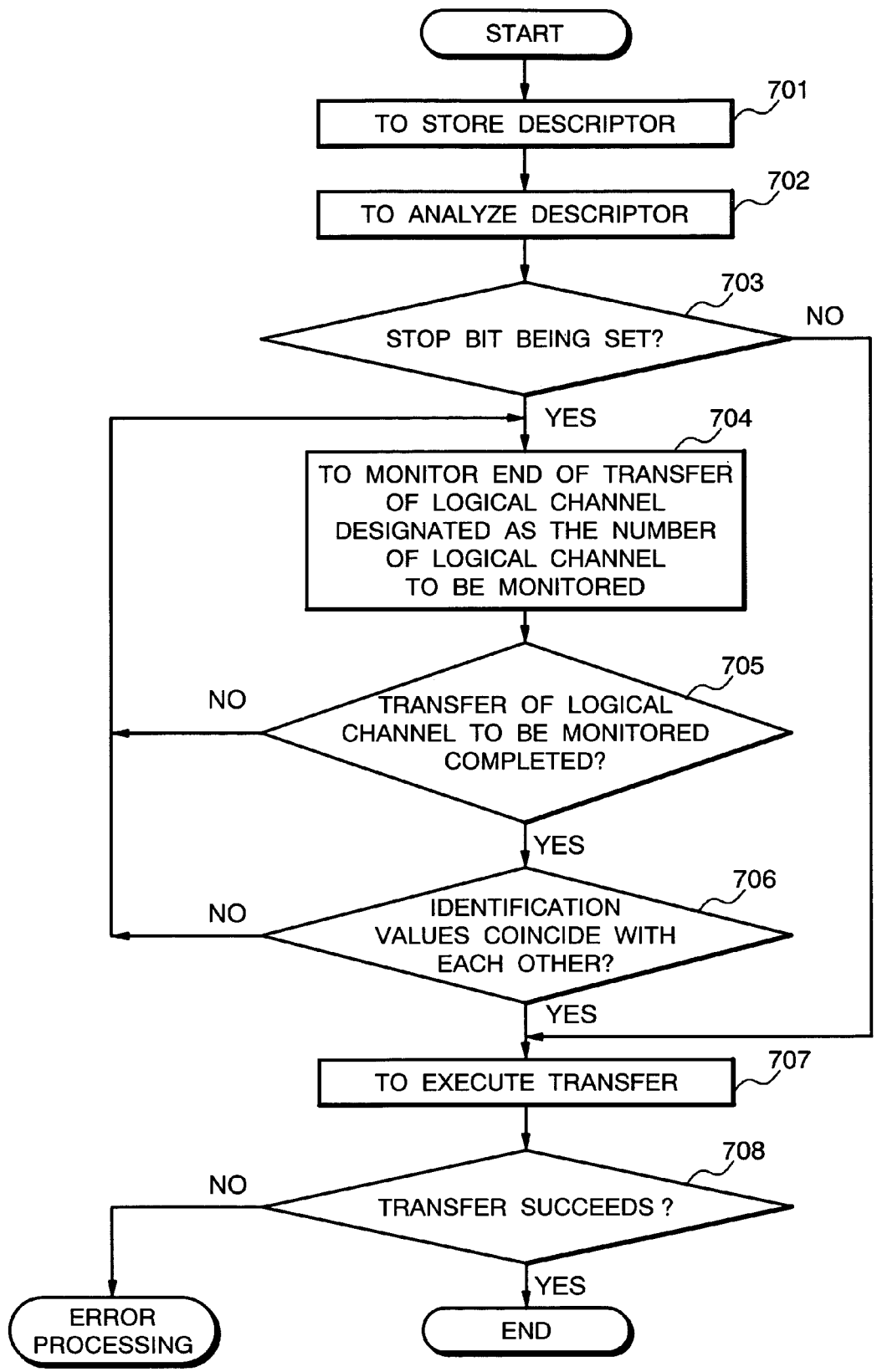
FIG. 7 is a flow chart for use in explaining processing of communication control according to the second embodiment of the present invention.

FIG. 7 is a flow chart for use in explaining processing of (active system) communication control according to the second embodiment of the present invention.

With reference to FIG. 7, in the processing of the active system communication control according to the present embodiment, first, a descriptor is stored in the input data buffer 50 (Step 701) and the scheduler/packet generation unit 30 analyzes information of the stored descriptor (Step 702).

Here, in a case where the stop bit 52 is recorded in the descriptor (Step 703), temporarily stop the transfer of a packet indicated by the descriptor to monitor the end of transfer of a logical channel designated by the number of logical channel to be monitored 58 (Step 704). Then, when the transfer of the logical channel to be monitored is completed (Step 705) and when the identification value 57 of the descriptor of the logical channel to be monitored and the monitoring identification value 59 of the descriptor of the waiting logical channel are equal (Step 706), release the temporary stop to execute transfer (Step 707). Here, even when the transfer of the logical channel to be monitored is completed, if the identification value 57 and the monitoring identification value 59 are not equal to each other, the routine again returns to Step 704 to monitor the completion of the transfer of the same logical channel.

On the other hand, in a case where the stop bit 52 is not recorded in the descriptor, start the transfer immediately (Steps 703 and 707).

Then, in a case where data transfer at Step 707 succeeds, if the transfer processing by the logical channel is completed to result in a failure in transfer, execute the error processing.

Next, processing of the present embodiment will be described with respect to a specific case as an example.

Figure 8:
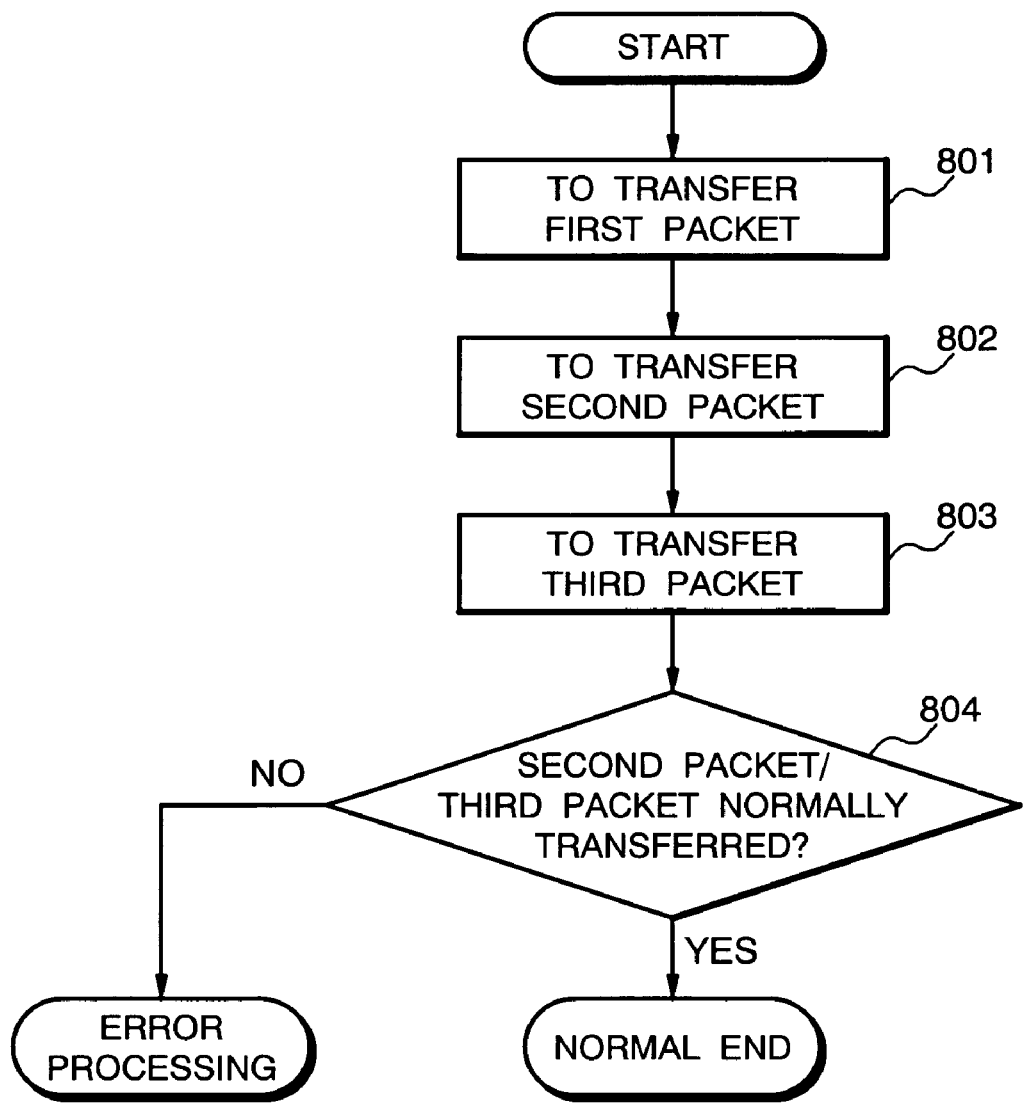
FIG. 8 is a flow chart for use in explaining synchronous processing conducted by the communication control system according to the second embodiment of the present invention.
Figure 9:
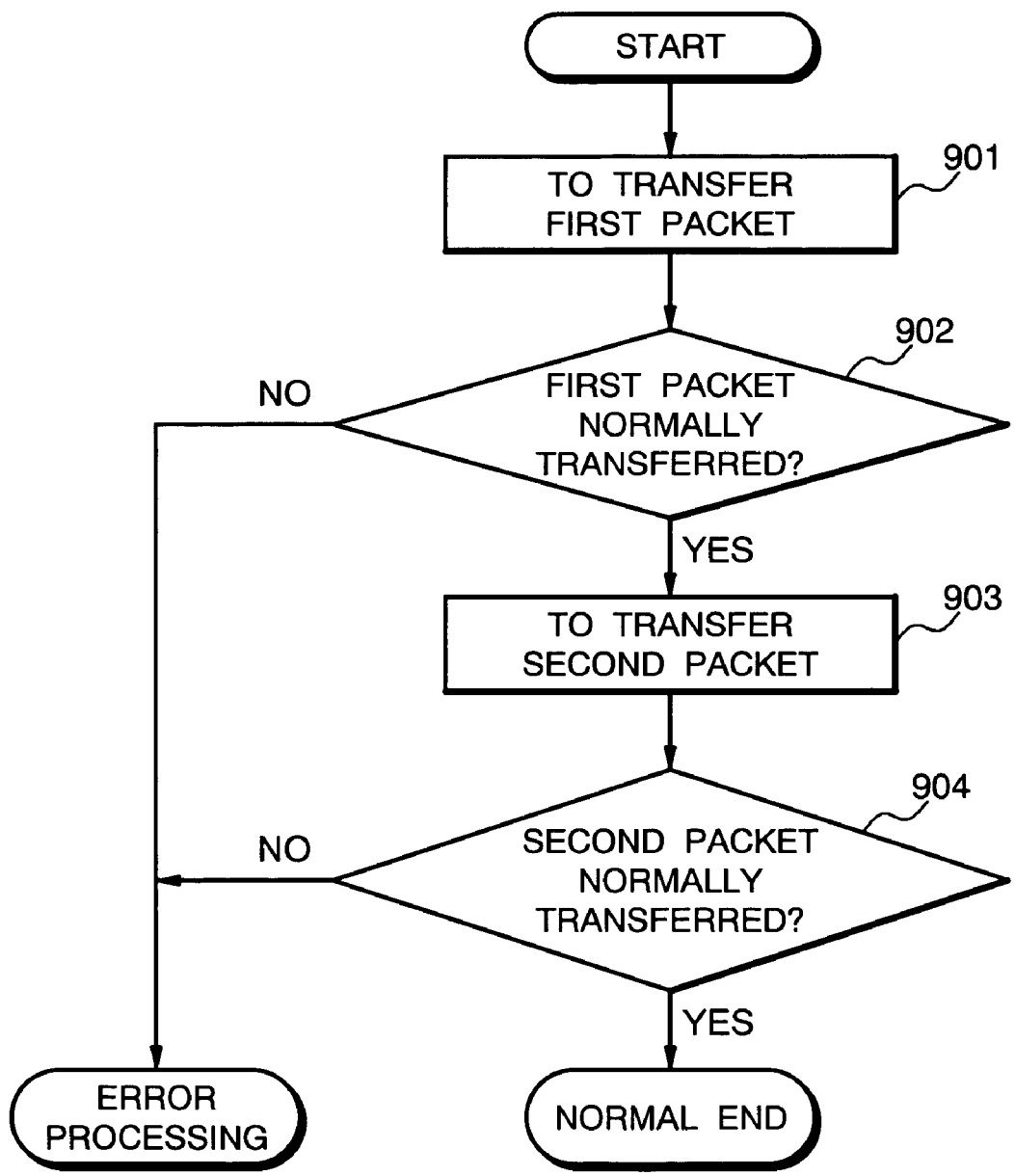
FIG. 9 is a flow chart for use in explaining sequential processing conducted by a conventional communication control system.
Figure 10:
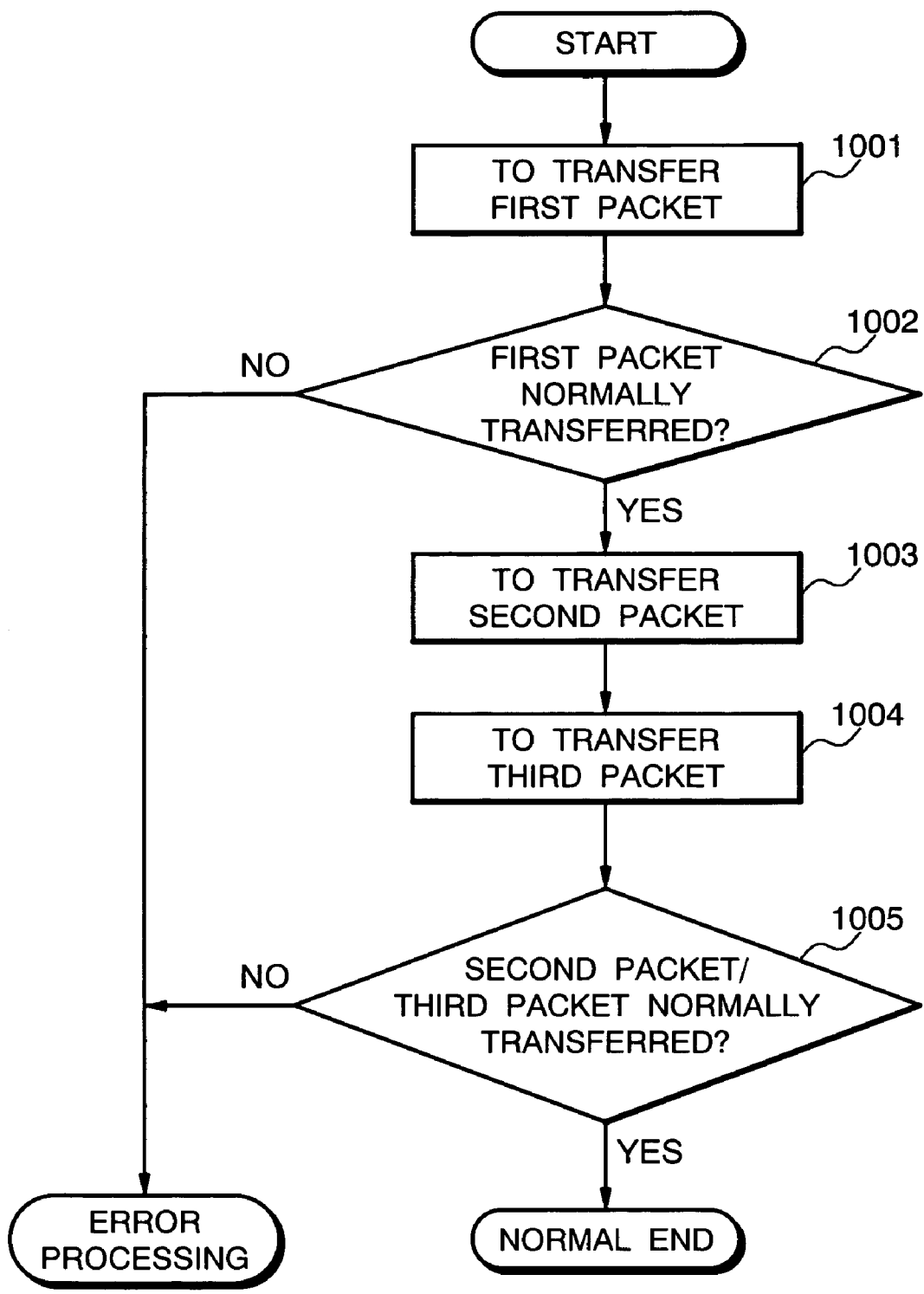
FIG. 10 is a flow chart for use in explaining synchronous processing conducted by a conventional communication control system.

FIG. 8 is a flow chart for use in explaining synchronous processing by the communication control system according the second embodiment of the present invention, which shows the simplest example of synchronous processing of simultaneously transferring a second packet and a third packet after a first packet is transferred and normal end thereof is confirmed. Assume that the second packet and the third packet need to be transferred as simultaneously as possible.

With reference to FIG. 8, according to the active system of the present embodiment, after the first packet is transferred with the logical channel number "1" (Step 801), the second packet can be subsequently transferred with the logical channel number "2" (Step 802) and furthermore the third packet can be transferred with the logical channel number "3" (Step 803) without waiting for the result to lead to normal end after waiting for only an ultimate result (Step 804).

The foregoing procedure enables more reduction of overhead for the confirmation of transfer as compared with that by a conventional technique, as well as improving synchronism between the second and the third packets because of high-speed activation in the data link layer.

The active system synchronous processing in the example shown in FIG. 8 will be described in more detail.

Assume in the following description that the first packet is transferred by a logical channel with the logical channel number "1" under the control of the logical channel first control circuit and that the corresponding descriptor is the descriptor A. Similarly, assume that the second packet is transferred by a logical channel with the logical channel number "2" under the control of the logical channel second control circuit and that the corresponding descriptor is the descriptor B, and that the third packet is transferred by a logical channel with the logical channel number "2" under the control of the logical channel third control circuit and that the corresponding descriptor is the descriptor B.

First, in the active system, since the first packet is on the side to be monitored, no special setting of a descriptor is necessary, so that the descriptor is transferred to the communication control device with the number of logical channel to be used "1" set at the control segment of the descriptor and, for example, "5", set at an arbitrary identification value 57.

Since the second and the third packets are temporarily stopped to have their transfer activated after monitoring the end of normal transfer of the first packet, both of their descriptors are transferred to the communication control device, with the stop bit 52 set at the control segment, the number of logical channel to be monitored 58 set to "1" which is the number of logical channel to be used for the first packet and the monitoring identification value 59 set to "5" which is the descriptor identification value of the first packet.

Since the scheduler/packet generation unit 30 schedules descriptors basically in the order of their storage into the input buffer 50, the unit first generates a packet based on the descriptor A and allocates the packet to the relevant logical channel first control circuit 20.

Since the descriptor has the stop bit 52 set at the control segment, the second packet is temporarily stopped and the unit 30 refrains from generation of a packet and allocation thereof to a logical channel control circuit. The third packet is similarly handled to enter the temporarily stopped state.

Thereafter, upon notification of a transmission confirmation packet for the first packet made by the partner's node, the packet is notified to the packet reception processing unit 40 through the inter-node interface 10 and the logical channel first control circuit 20.

The packet reception processing unit 40 searches all the descriptors stored in the input buffer 50 for the number of logical channel to be monitored 58 and the monitoring identification value 59 to find a descriptor whose values coincide with the logical channel number "1" and the identification value "5" of the descriptor of the packet whose transfer is completed. In this case, since descriptors of the second packet and the third packet are relevant, reset the stop bit 52 of the control segments of both the descriptors.

As a result, the temporarily stopped state of the descriptors for transferring the second and the third packets using the logical channel numbers "2" and "3" is released, so that packets are generated by the scheduler/packet generation unit 30 and allocated to the logical channel second control circuit and the logical channel third control circuit, respectively, to simultaneously conduct transfer of the second and the third packets to the transfer destination nodes.

When an error notification packet is transferred from the partner's node, the packet reception processing unit 40 gives an error notification to the higher-order management layer by interruption etc.

Thus, in addition to the same effects attained by the first embodiment, the communication control system according to the present embodiment enables such processing as synchronous transfer of packets to be accurately executed at a high speed and with ease.

Moreover, strictly and precisely checking a correspondence of logical channels between the side conducting the preceding transfer and the waiting side is enabled by the method employing collation of the identification value 57.

As other embodiment, the above-described structures of the passive system according to the first embodiment and the active system according to the second embodiment can be freely combined.

More specifically, although the above-described communication control by a data link layer requires a descriptor to have at least one of the number of logical channel to be activated 54 and the number of logical channel to be monitored 58 which are data indicative of a correspondence of logical channels between the side conducting the preceding transfer and the waiting side, each processing using three information, the number of logical channel to be activated 54, the number of logical channel to be monitored 58 and the identification value 57, is independent of each other to allow various combinations.

In addition, in a mode using the number of logical channel to be activated 54, provision of the activation bit 53 can be omitted. This is because information whether a value is "set/not set" at the number of logical channel to be activated 54 corresponds to information of "ON/OFF" of the activation bit 53.

Similarly, in a mode using the number of logical channel to be monitored 58, provision of the stop bit 52 can be omitted. This is because information whether a value is "set/not set" at the number of logical channel to be monitored 58 corresponds to information of "ON/OFF" of the stop bit 52.

Nevertheless, the stop bit 52 and the activation bit 53 have the advantage in that less resources are required for their provision and they can be processed more easily than a system referring to the above-described number of logical channel to be activated 54 and the number of logical channel to be monitored 58, and they can be used in combination with the system referring to the above-described number of logical channel to be activated 54 and the number of logical channel to be monitored 58 to make deliberate determination.

Furthermore, although in the active system synchronous processing according to the second embodiment, to one logical channel on the side conducting the preceding transfer, the number of logical channel to be monitored 58 of a plurality of logical channels on the waiting side correspond, such a mode is possible as allows the same logical channel on the waiting side to correspond to the number of logical channel to be activated 54 of a plurality of logical channels on the side conducting the preceding transfer in the passive system of the first embodiment.

In this case, applicable to the transfer of a logical channel on the side conducting the preceding transfer corresponding to the same waiting logical channel are such a method of releasing temporary stop when one transfer of the plurality of logical channels is completed or a method of releasing temporary stop when all the corresponding transfers are completed.

Each function of the communication control system according to the present embodiment can be realized not only by hardware but also by loading a computer program having each function (communication control program) into a memory of a computer processing device. The communication control program is stored in a recording medium (reference numeral) such as a magnetic disc or a semiconductor memory. Then, loading the program from the recording medium into the computer processing device to control operation of the computer processing device realizes the above-described respective functions.

As described in the foregoing, the communication control system of the present invention attains the following effects.

First, overhead caused by intervention of a higher-order management layer at the time of communication processing can be reduced. The reason is that transmission confirmation of transfer and the accompanying activation of subsequent packet transfer which are ordinarily conducted by a higher-order management layer are conducted in a data link layer.

The second effect is that a time lag and overhead caused by transfer activation by a higher-order management layer at the time of synchronous transfer processing between a plurality of logical channels can be reduced. The reason is that synchronous transfer processing of a plurality of packets ordinarily conducted in a higher-order management layer upon normal end of certain packet transfer is realized by holding a plurality of packets in a data link layer in advance to conduct confirmation of normal end and synchronous activation and transfer processing of a plurality of packets in the data link layer.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

What is claimed is:

1. A communication control system having a data link layer which executes data transfer on a logical channel for controlling packet transfer conducted by a plurality of said logical channels between nodes, comprising:

means for recording, in a descriptor for recording information regarding transfer by each logical channel, information including information regarding an order of transfer by each said logical channel, wherein said data link layer includes means for executing data transfer by each said logical channel based on the information recorded in said descriptor including the information regarding the order of transfer by each said logical channel designated by said descriptor.

2. The communication control system as set forth in claim 1, wherein said descriptor has a stop bit indicating that transfer by the logical channel in question is not to be executed immediately but to be started on condition that transfer by other logical channel designated is completed, and said data link layer includes means for temporarily stopping transfer processing by said logical channel having said stop bit recorded in said descriptor to wait for said transfer starting condition to be fulfilled.

3. The communication control system as set forth in claim 1, wherein said descriptor has an activation bit indicating that completion of transfer by the logical channel in question is set to be a transfer starting condition for other logical channel designated, and said data link layer includes means for monitoring the completion of transfer by said logical channel having said activation bit recorded in said descriptor to determine fulfillment of said transfer starting condition for said other logical channel designated upon the completion of the transfer.

4. The communication control system as set forth in claim 1, wherein
said descriptor has
an activation bit indicating that completion of transfer by the logical channel in question is set to be a transfer starting condition for other logical channel designated, and
a stop bit indicating that transfer by the logical channel in question is not to be executed immediately but to be started on condition that transfer by other logical channel designated is completed, and
said data link layer includes
means for temporarily stopping transfer processing by said logical channel having said stop bit recorded in said descriptor to wait for said transfer starting condition to be fulfilled, and
means for monitoring the completion of transfer by said logical channel having said activation bit recorded in said descriptor to determine fulfillment of said transfer starting condition for said other logical channel designated upon the completion of the transfer.

5. The communication control system as set forth in claim 1, wherein
said descriptor has
a number of logical channel to be activated for specifying other designated logical channel having the completion of transfer by the logical channel in question set to be a transfer starting condition, and
said data link layer includes
means for monitoring the completion of transfer by said logical channel having said number of logical channel to be activated recorded in said descriptor to determine fulfillment of said transfer starting condition for a logical channel indicated by said number of logical channel to be activated upon the completion of the transfer of said logical channel.

6. The communication control system as set forth in claim 1, wherein
said descriptor has
a stop bit indicating that transfer by the logical channel in question is not to be executed immediately but to be started on condition that transfer by other logical channel designated is completed, and
a number of logical channel to be activated for specifying other designated logical channel having the completion of transfer by the logical channel in question set to be a transfer starting condition, and
said data link layer includes
means for temporarily stopping transfer processing by said logical channel having said stop bit recorded in said descriptor to wait for said transfer starting condition to be fulfilled, and
means for monitoring the completion of transfer by said logical channel having said number of logical channel to be activated recorded in said descriptor to determine fulfillment of said transfer starting condition for a logical channel indicated by said number of logical channel to be activated upon the completion of the transfer of said logical channel.

7. The communication control system as set forth in claim 1, wherein
said descriptor has
an activation bit indicating that completion of transfer by the logical channel in question is set to be a transfer starting condition for other logical channel designated, and
a number of logical channel to be activated for specifying other designated logical channel having the completion of transfer by the logical channel in question set to be a transfer starting condition, and
said data link layer includes
means for monitoring the completion of transfer by said logical channel having said activation bit recorded in said descriptor to determine fulfillment of said transfer starting condition for said other logical channel designated upon the completion of the transfer, and
means for monitoring the completion of transfer by said logical channel having said number of logical channel to be activated recorded in said descriptor to determine fulfillment of said transfer starting condition for a logical channel indicated by said number of logical channel to be activated upon the completion of the transfer of said logical channel.

8. The communication control system as set forth in claim 1, wherein
said descriptor has
an activation bit indicating that completion of transfer by the logical channel in question is set to be a transfer starting condition for other logical channel designated,
a stop bit indicating that transfer by the logical channel in question is not to be executed immediately but to be started on condition that transfer by other logical channel designated is completed, and
a number of logical channel to be activated for specifying other designated logical channel having the completion of transfer by the logical channel in question set to be a transfer starting condition, and
said data link layer includes
means for temporarily stopping transfer processing by said logical channel having said stop bit recorded in said descriptor to wait for said transfer starting condition to be fulfilled,
means for monitoring the completion of transfer by said logical channel having said activation bit recorded in said descriptor to determine fulfillment of said transfer starting condition for said other logical channel designated upon the completion of the transfer, and
means for monitoring the completion of transfer by said logical channel having said number of logical channel to be activated recorded in said descriptor to determine fulfillment of said transfer starting condition for a logical channel indicated by said number of logical channel to be activated upon the completion of the transfer of said logical channel.

9. The communication control system as set forth in claim 1, wherein
said descriptor has
a number of logical channel to be monitored for, in order to monitor the completion of transfer by other designated logical channel which is set to be a transfer starting condition for the logical channel in question, specifying said designated other logical channel to be monitored, and
said data link layer includes
means for temporarily stopping transfer by said logical channel having said number of logical channel to be monitored recorded in said descriptor and monitoring the completion of transfer by a logical channel indicated by said number of logical channel to be monitored to determine fulfillment of said transfer starting condition for the logical channel in question upon the completion of the transfer.

10. The communication control system as set forth in claim 1, wherein
said descriptor has
a stop bit indicating that transfer by the logical channel in question is not to be executed immediately but to be started on condition that transfer by other logical channel designated is completed, and
a number of logical channel to be monitored for, in order to monitor the completion of transfer by other designated logical channel which is set to be a transfer starting condition for the logical channel in question, specifying said designated other logical channel to be monitored, and
said data link layer includes
means for temporarily stopping transfer processing by said logical channel having said stop bit recorded in said descriptor to wait for said transfer starting condition to be fulfilled, and
means for temporarily stopping transfer by said logical channel having said number of logical channel to be monitored recorded in said descriptor and monitoring the completion of transfer by a logical channel indicated by said number of logical channel to be monitored to determine fulfillment of said transfer starting condition for the logical channel in question upon the completion of the transfer.

11. The communication control system as set forth in claim 1, wherein
said descriptor has
an activation bit indicating that completion of transfer by the logical channel in question is set to be a transfer starting condition for other logical channel designated, and
a number of logical channel to be monitored for, in order to monitor the completion of transfer by other designated logical channel which is set to be a transfer starting condition for the logical channel in question, specifying said designated other logical channel to be monitored, and
said data link layer includes
means for monitoring the completion of transfer by said logical channel having said activation bit recorded in said descriptor to determine fulfillment of said transfer starting condition for said other logical channel designated upon the completion of the transfer, and
means for temporarily stopping transfer by said logical channel having said number of logical channel to be monitored recorded in said descriptor and monitoring the completion of transfer by a logical channel indicated by said number of logical channel to be monitored to determine fulfillment of said transfer starting condition for the logical channel in question upon the completion of the transfer.

12. The communication control system as set forth in claim 1, wherein
said descriptor has
an activation bit indicating that completion of transfer by the logical channel in question is set to be a transfer starting condition for other logical channel designated,
a stop bit indicating that transfer by the logical channel in question is not to be executed immediately but to be started on condition that transfer by other logical channel designated is completed, and
a number of logical channel to be monitored for, in order to monitor the completion of transfer by other designated logical channel which is set to be a transfer starting condition for the logical channel in question, specifying said designated other logical channel to be monitored, and
said data link layer includes
means for temporarily stopping transfer processing by said logical channel having said stop bit recorded in said descriptor to wait for said transfer starting condition to be fulfilled,
means for monitoring the completion of transfer by said logical channel having said activation bit recorded in said descriptor to determine fulfillment of said transfer starting condition for said other logical channel designated upon the completion of the transfer, and
means for temporarily stopping transfer by said logical channel having said number of logical channel to be monitored recorded in said descriptor and monitoring the completion of transfer by a logical channel indicated by said number of logical channel to be monitored to determine fulfillment of said transfer starting condition for the logical channel in question upon the completion of the transfer.

13. The communication control system as set forth in claim 1, wherein
said descriptor has
a number of logical channel to be activated for specifying other designated logical channel having the completion of transfer by the logical channel in question set to be a transfer starting condition, and
a number of logical channel to be monitored for, in order to monitor the completion of transfer by other designated logical channel which is set to be a transfer starting condition for the logical channel in question, specifying said designated other logical channel to be monitored, and
said data link layer includes
means for monitoring the completion of transfer by said logical channel having said number of logical channel to be activated recorded in said descriptor to determine fulfillment of said transfer starting condition for a logical channel indicated by said number of logical channel to be activated upon the completion of the transfer of said logical channel, and
means for temporarily stopping transfer by said logical channel having said number of logical channel to be monitored recorded in said descriptor and monitoring the completion of transfer by a logical channel indicated by said number of logical channel to be monitored to determine fulfillment of said transfer starting condition for the logical channel in question upon the completion of the transfer.

14. The communication control system as set forth in claim 1, wherein
said descriptor has
a stop bit indicating that transfer by the logical channel in question is not to be executed immediately but to be started on condition that transfer by other logical channel designated is completed,
a number of logical channel to be activated for specifying other designated logical channel having the completion of transfer by the logical channel in question set to be a transfer starting condition, and
a number of logical channel to be monitored for, in order to monitor the completion of transfer by other designated logical channel which is set to be a transfer starting condition for the logical channel in question, specifying said designated other logical channel to be monitored, and said data link layer includes means for temporarily stopping transfer processing by said logical channel having said stop bit recorded in said descriptor to wait for said transfer starting condition to be fulfilled, means for monitoring the completion of transfer by said logical channel having said number of logical channel to be activated recorded in said descriptor to determine fulfillment of said transfer starting condition for a logical channel indicated by said number of logical channel to be activated upon the completion of the transfer of said logical channel, and means for temporarily stopping transfer by said logical channel having said number of logical channel to be monitored recorded in said descriptor and monitoring the completion of transfer by a logical channel indicated by said number of logical channel to be monitored to determine fulfillment of said transfer starting condition for the logical channel in question upon the completion of the transfer.

15. The communication control system as set forth in claim 1, wherein said descriptor has an activation bit indicating that completion of transfer by the logical channel in question is set to be a transfer starting condition for other logical channel designated, a number of logical channel to be activated for specifying other designated logical channel having the completion of transfer by the logical channel in question set to be a transfer starting condition, and a number of logical channel to be monitored for, in order to monitor the completion of transfer by other designated logical channel which is set to be a transfer starting condition for the logical channel in question, specifying said designated other logical channel to be monitored, and said data link layer includes means for monitoring the completion of transfer by said logical channel having said activation bit recorded in said descriptor to determine fulfillment of said transfer starting condition for said other logical channel designated upon the completion of the transfer, means for monitoring the completion of transfer by said logical channel having said number of logical channel to be activated recorded in said descriptor to determine fulfillment of said transfer starting condition for a logical channel indicated by said number of logical channel to be activated upon the completion of the transfer of said logical channel, and means for temporarily stopping transfer by said logical channel having said number of logical channel to be monitored recorded in said descriptor and monitoring the completion of transfer by a logical channel indicated by said number of logical channel to be monitored to determine fulfillment of said transfer starting condition for the logical channel in question upon the completion of the transfer.

16. The communication control system as set forth in claim 1, wherein said descriptor has an activation bit indicating that completion of transfer by the logical channel in question is set to be a transfer starting condition for other logical channel designated, a stop bit indicating that transfer by the logical channel in question is not to be executed immediately but to be started on condition that transfer by other logical channel designated is completed, a number of logical channel to be activated for specifying other designated logical channel having the completion of transfer by the logical channel in question set to be a transfer starting condition, and a number of logical channel to be monitored for, in order to monitor the completion of transfer by other designated logical channel which is set to be a transfer starting condition for the logical channel in question, specifying said designated other logical channel to be monitored, and said data link layer includes means for temporarily stopping transfer processing by said logical channel having said stop bit recorded in said descriptor to wait for said transfer starting condition to be fulfilled, means for monitoring the completion of transfer by said logical channel having said activation bit recorded in said descriptor to determine fulfillment of said transfer starting condition for said other logical channel designated upon the completion of the transfer, means for monitoring the completion of transfer by said logical channel having said number of logical channel to be activated recorded in said descriptor to determine fulfillment of said transfer starting condition for a logical channel indicated by said number of logical channel to be activated upon the completion of the transfer of said logical channel, and means for temporarily stopping transfer by said logical channel having said number of logical channel to be monitored recorded in said descriptor and monitoring the completion of transfer by a logical channel indicated by said number of logical channel to be monitored to determine fulfillment of said transfer starting condition for the logical channel in question upon the completion of the transfer.

17. The communication control system as set forth in claim 1, wherein said descriptor has an identification value and a monitoring identification value as numerical data, and said data link layer includes means for comparing, at the time of determination of said transfer starting condition, a value of said monitoring identification value of said descriptor of a waiting logical channel which is a logical channel on the side waiting for said transfer starting condition to be fulfilled and a value of said identification value of a preceding logical channel which is a logical channel on the side which conducts transfer prior to said waiting logical channel and whose transfer completion is said transfer starting condition for said waiting logical channel to determine fulfillment of said transfer starting condition only when the value of said monitoring identification value and the value of said identification value are equal.

18. The communication control system as set forth in claim 1, wherein said descriptor has a stop bit indicating that transfer by the logical channel in question is not to be executed immediately but to be started on condition that transfer by other logical channel designated is completed, and an identification value and a monitoring identification value as numerical data, and said data link layer includes means for temporarily stopping transfer processing by said logical channel having said stop bit recorded in said descriptor to wait for said transfer starting condition to be fulfilled, and means for comparing, at the time of determination of said transfer starting condition, a value of said monitoring identification value of said descriptor of a waiting logical channel which is a logical channel on the side waiting for said transfer starting condition to be fulfilled and a value of said identification value of a preceding logical channel which is a logical channel on the side which conducts transfer prior to said waiting logical channel and whose transfer completion is said transfer starting condition for said waiting logical channel to determine fulfillment of said transfer starting condition only when the value of said monitoring identification value and the value of said identification value are equal.

19. The communication control system as set forth in claim 1, wherein said descriptor has an activation bit indicating that completion of transfer by the logical channel in question is set to be a transfer starting condition for other logical channel designated, and an identification value and a monitoring identification value as numerical data, and said data link layer includes means for monitoring the completion of transfer by said logical channel having said activation bit recorded in said descriptor to determine fulfillment of said transfer starting condition for said other logical channel designated upon the completion of the transfer, and means for comparing, at the time of determination of said transfer starting condition, a value of said monitoring identification value of said descriptor of a waiting logical channel which is a logical channel on the side waiting for said transfer starting condition to be fulfilled and a value of said identification value of a preceding logical channel which is a logical channel on the side which conducts transfer prior to said waiting logical channel and whose transfer completion is said transfer starting condition for said waiting logical channel to determine fulfillment of said transfer starting condition only when the value of said monitoring identification value and the value of said identification value are equal.

20. The communication control system as set forth in claim 1, wherein said descriptor has an activation bit indicating that completion of transfer by the logical channel in question is set to be a transfer starting condition for other logical channel designated, a stop bit indicating that transfer by the logical channel in question is not to be executed immediately but to be started on condition that transfer by other logical channel designated is completed, and an identification value and a monitoring identification value as numerical data, and said data link layer includes means for temporarily stopping transfer processing by said logical channel having said stop bit recorded in said descriptor to wait for said transfer starting condition to be fulfilled, means for monitoring the completion of transfer by said logical channel having said activation bit recorded in said descriptor to determine fulfillment of said transfer starting condition for said other logical channel designated upon the completion of the transfer, and means for comparing, at the time of determination of said transfer starting condition, a value of said monitoring identification value of said descriptor of a waiting logical channel which is a logical channel on the side waiting for said transfer starting condition to be fulfilled and a value of said identification value of a preceding logical channel which is a logical channel on the side which conducts transfer prior to said waiting logical channel and whose transfer completion is said transfer starting condition for said waiting logical channel to determine fulfillment of said transfer starting condition only when the value of said monitoring identification value and the value of said identification value are equal.

21. The communication control system as set forth in claim 1, wherein said descriptor has a number of logical channel to be activated for specifying other designated logical channel having the completion of transfer by the logical channel in question set to be a transfer starting condition, and an identification value and a monitoring identification value as numerical data, and said data link layer includes means for monitoring the completion of transfer by said logical channel having said number of logical channel to be activated recorded in said descriptor to determine fulfillment of said transfer starting condition for a logical channel indicated by said number of logical channel to be activated upon the completion of the transfer of said logical channel, and means for comparing, at the time of determination of said transfer starting condition, a value of said monitoring identification value of said descriptor of a waiting logical channel which is a logical channel on the side waiting for said transfer starting condition to be fulfilled and a value of said identification value of a preceding logical channel which is a logical channel on the side which conducts transfer prior to said waiting logical channel and whose transfer completion is said transfer starting condition for said waiting logical channel to determine fulfillment of said transfer starting condition only when the value of said monitoring identification value and the value of said identification value are equal.

22. The communication control system as set forth in claim 1, wherein said descriptor has a stop bit indicating that transfer by the logical channel in question is not to be executed immediately but to be started on condition that transfer by other logical channel designated is completed, a number of logical channel to be activated for specifying other designated logical channel having the completion of transfer by the logical channel in question set to be a transfer starting condition, and an identification value and a monitoring identification value as numerical data, and said data link layer includes means for temporarily stopping transfer processing by said logical channel having said stop bit recorded in said descriptor to wait for said transfer starting condition to be fulfilled, means for monitoring the completion of transfer by said logical channel having said number of logical channel to be activated recorded in said descriptor to determine fulfillment of said transfer starting condition for a logical channel indicated by said number of logical channel to be activated upon the completion of the transfer of said logical channel, and means for comparing, at the time of determination of said transfer starting condition, a value of said monitoring identification value of said descriptor of a waiting logical channel which is a logical channel on the side waiting for said transfer starting condition to be fulfilled and a value of said identification value of a preceding logical channel which is a logical channel on the side which conducts transfer prior to said waiting logical channel and whose transfer completion is said transfer starting condition for said waiting logical channel to determine fulfillment of said transfer starting condition only when the value of said monitoring identification value and the value of said identification value are equal.

23. The communication control system as set forth in claim 1, wherein said descriptor has an activation bit indicating that completion of transfer by the logical channel in question is set to be a transfer starting condition for other logical channel designated, a number of logical channel to be activated for specifying other designated logical channel having the completion of transfer by the logical channel in question set to be a transfer starting condition, and an identification value and a monitoring identification value as numerical data, and said data link layer includes means for monitoring the completion of transfer by said logical channel having said activation bit recorded in said descriptor to determine fulfillment of said transfer starting condition for said other logical channel designated upon the completion of the transfer, means for monitoring the completion of transfer by said logical channel having said number of logical channel to be activated recorded in said descriptor to determine fulfillment of said transfer starting condition for a logical channel indicated by said number of logical channel to be activated upon the completion of the transfer of said logical channel, and means for comparing, at the time of determination of said transfer starting condition, a value of said monitoring identification value of said descriptor of a waiting logical channel which is a logical channel on the side waiting for said transfer starting condition to be fulfilled and a value of said identification value of a preceding logical channel which is a logical channel on the side which conducts transfer prior to said waiting logical channel and whose transfer completion is said transfer starting condition for said waiting logical channel to determine fulfillment of said transfer starting condition only when the value of said monitoring identification value and the value of said identification value are equal.

24. The communication control system as set forth in claim 1, wherein said descriptor has an activation bit indicating that completion of transfer by the logical channel in question is set to be a transfer starting condition for other logical channel designated, a stop bit indicating that transfer by the logical channel in question is not to be executed immediately but to be started on condition that transfer by other logical channel designated is completed, a number of logical channel to be activated for specifying other designated logical channel having the completion of transfer by the logical channel in question set to be a transfer starting condition, and an identification value and a monitoring identification value as numerical data, and said data link layer includes means for temporarily stopping transfer processing by said logical channel having said stop bit recorded in said descriptor to wait for said transfer starting condition to be fulfilled, means for monitoring the completion of transfer by said logical channel having said activation bit recorded in said descriptor to determine fulfillment of said transfer starting condition for said other logical channel designated upon the completion of the transfer, means for monitoring the completion of transfer by said logical channel having said number of logical channel to be activated recorded in said descriptor to determine fulfillment of said transfer starting condition for a logical channel indicated by said number of logical channel to be activated upon the completion of the transfer of said logical channel, and means for comparing, at the time of determination of said transfer starting condition, a value of said monitoring identification value of said descriptor of a waiting logical channel which is a logical channel on the side waiting for said transfer starting condition to be fulfilled and a value of said identification value of a preceding logical channel which is a logical channel on the side which conducts transfer prior to said waiting logical channel and whose transfer completion is said transfer starting condition for said waiting logical channel to determine fulfillment of said transfer starting condition only when the value of said monitoring identification value and the value of said identification value are equal.

25. The communication control system as set forth in claim 1, wherein said descriptor has a number of logical channel to be monitored for, in order to monitor the completion of transfer by other designated logical channel which is set to be a transfer starting condition for the logical channel in question, specifying said designated other logical channel to be monitored, and an identification value and a monitoring identification value as numerical data, and said data link layer includes means for temporarily stopping transfer by said logical channel having said number of logical channel to be monitored recorded in said descriptor and monitoring the completion of transfer by a logical channel indicated by said number of logical channel to be monitored to determine fulfillment of said transfer starting condition for the logical channel in question upon the completion of the transfer, and means for comparing, at the time of determination of said transfer starting condition, a value of said monitoring identification value of said descriptor of a waiting logical channel which is a logical channel on the side waiting for said transfer starting condition to be fulfilled and a value of said identification value of a preceding logical channel which is a logical channel on the side which conducts transfer prior to said waiting logical channel and whose transfer completion is said transfer starting condition for said waiting logical channel to determine fulfillment of said transfer starting condition only when the value of said monitoring identification value and the value of said identification value are equal.

26. The communication control system as set forth in claim 1, wherein data transfer is completed when a management layer confirms the data transfer.

27. The communication control system as set forth in claim 1, wherein
a management layer designates a logical channel to transfer said descriptor to the data link layer,
said data link layer analyzes said descriptor, sets up an appropriate packet and outputs a message and data to a physical layer to execute data transfer to a node of a third party, and
the management layer confirms the data transfer to complete the transfer.

28. The communication control system as set forth in claim 1, wherein the information recorded in said descriptor also includes a number of a logical channel used to transfer said descriptor from a management layer to said data link layer.

29. A method of controlling a communication control system having a data link layer which executes data transfer on a logical channel for controlling packet transfer conducted by a plurality of said logical channels between nodes, comprising the steps of:
the step of recording, in a descriptor for recording information regarding transfer by each logical channel, information including information regarding an order of transfer by each said logical channel, and
the step of said data link layer of executing data transfer by each said logical channel based on the information recorded in said descriptor including the information regarding the order of transfer by each said logical channel designated by said descriptor.

30. The method of controlling a communication control system as set forth in claim 29, further comprising:
the step of recording in said descriptor a stop bit indicating that transfer by the logical channel in question is not to be executed immediately but to be started on condition that transfer by other logical channel designated is completed, and
the step of said data link layer of temporarily stopping transfer processing by said logical channel having said stop bit recorded in said descriptor to wait for said transfer starting condition to be fulfilled.

31. The method of controlling a communication control system as set forth in claim 29, further comprising:
the step of recording in said descriptor an activation bit indicating that completion of transfer by the logical channel in question is set to be a transfer starting condition for other logical channel designated, and
the step of said data link layer of monitoring the completion of transfer by said logical channel having said activation bit recorded in said descriptor to determine fulfillment of said transfer starting condition for said other logical channel designated upon the completion of the transfer.

32. The method of controlling a communication control system as set forth in claim 29, further comprising:
the step of recording in said descriptor a stop bit indicating that transfer by the logical channel in question is not to be executed immediately but to be started on condition that transfer by other logical channel designated is completed,
the step of recording in said descriptor an activation bit indicating that completion of transfer by the logical channel in question is set to be a transfer starting condition for other logical channel designated, and
the steps of said data link layer of:
temporarily stopping transfer processing by said logical channel having said stop bit recorded in said descriptor to wait for said transfer starting condition to be fulfilled, and
monitoring the completion of transfer by said logical channel having said activation bit recorded in said descriptor to determine fulfillment of said transfer starting condition for said other logical channel designated upon the completion of the transfer.

33. The method of controlling a communication control system as set forth in claim 29, further comprising:
the step of recording in said descriptor a number of logical channel to be activated for specifying other designated logical channel having the completion of transfer by the logical channel in question set to be a transfer starting condition, and
the step of said data link layer of monitoring the completion of transfer by said logical channel having said number of logical channel to be activated recorded in said descriptor to determine fulfillment of said transfer starting condition for a logical channel indicated by said number of logical channel to be activated upon the completion of the transfer of said logical channel.

34. The method of controlling a communication control system as set forth in claim 29, comprising:
the step of recording in said descriptor a stop bit indicating that transfer by the logical channel in question is not to be executed immediately but to be started on condition that transfer by other logical channel designated is completed,
the step of recording in said descriptor a number of logical channel to be activated for specifying other designated logical channel having the completion of transfer by the logical channel in question set to be a transfer starting condition, and
the steps of said data link layer of:
temporarily stopping transfer processing by said logical channel having said stop bit recorded in said descriptor to wait for said transfer starting condition to be fulfilled, and
monitoring the completion of transfer by said logical channel having said number of logical channel to be activated recorded in said descriptor to determine fulfillment of said transfer starting condition for a logical channel indicated by said number of logical channel to be activated upon the completion of the transfer of said logical channel.

35. The method of controlling a communication control system as set forth in claim 29, further comprising:
the step of recording in said descriptor an activation bit indicating that completion of transfer by the logical channel in question is set to be a transfer starting condition for other logical channel designated, the step of recording in said descriptor a number of logical channel to be activated for specifying other designated logical channel having the completion of transfer by the logical channel in question set to be a transfer starting condition, and the steps of said data link layer of:

monitoring the completion of transfer by said logical channel having said activation bit recorded in said descriptor to determine fulfillment of said transfer starting condition for said other logical channel designated upon the completion of the transfer, and monitoring the completion of transfer by said logical channel having said number of logical channel to be activated recorded in said descriptor to determine fulfillment of said transfer starting condition for a logical channel indicated by said number of logical channel to be activated upon the completion of the transfer of said logical channel.

36. The method of controlling a communication control system as set forth in claim 29, comprising:

the step of recording in said descriptor a stop bit indicating that transfer by the logical channel in question is not to be executed immediately but to be started on condition that transfer by other logical channel designated is completed, the step of recording in said descriptor an activation bit indicating that completion of transfer by the logical channel in question is set to be a transfer starting condition for other logical channel designated, the step of recording in said descriptor a number of logical channel to be activated for specifying other designated logical channel having the completion of transfer by the logical channel in question set to be a transfer starting condition, and the steps of said data link layer of:

temporarily stopping transfer processing by said logical channel having said stop bit recorded in said descriptor to wait for said transfer starting condition to be fulfilled, monitoring the completion of transfer by said logical channel having said activation bit recorded in said descriptor to determine fulfillment of said transfer starting condition for said other logical channel designated upon the completion of the transfer, and monitoring the completion of transfer by said logical channel having said number of logical channel to be activated recorded in said descriptor to determine fulfillment of said transfer starting condition for a logical channel indicated by said number of logical channel to be activated upon the completion of the transfer of said logical channel.

37. The method of controlling a communication control system as set forth in claim 29, comprising:

the step of recording in said descriptor a number of logical channel to be monitored for, in order to monitor the completion of transfer by other designated logical channel which is set to be a transfer starting condition for the logical channel in question, specifying said designated other logical channel to be monitored, and the step of said data link layer of temporarily stopping transfer by said logical channel having said number of logical channel to be monitored recorded in said descriptor and monitoring the completion of transfer by a logical channel indicated by said number of logical channel to be monitored to determine fulfillment of said transfer starting condition for the logical channel in question upon the completion of the transfer.

38. The method of controlling a communication control system as set forth in claim 29, comprising:

the step of recording in said descriptor a stop bit indicating that transfer by the logical channel in question is not to be executed immediately but to be started on condition that transfer by other logical channel designated is completed, the step of recording in said descriptor a number of logical channel to be monitored for, in order to monitor the completion of transfer by other designated logical channel which is set to be a transfer starting condition for the logical channel in question, specifying said designated other logical channel to be monitored, and the steps of said data link layer of:

temporarily stopping transfer processing by said logical channel having said stop bit recorded in said descriptor to wait for said transfer starting condition to be fulfilled, and temporarily stopping transfer by said logical channel having said number of logical channel to be monitored recorded in said descriptor and monitoring the completion of transfer by a logical channel indicated by said number of logical channel to be monitored to determine fulfillment of said transfer starting condition for the logical channel in question upon the completion of the transfer.

39. The method of controlling a communication control system as set forth in claim 29, comprising:

the step of recording in said descriptor an activation bit indicating that completion of transfer by the logical channel in question is set to be a transfer starting condition for other logical channel designated, the step of recording in said descriptor a number of logical channel to be monitored for, in order to monitor the completion of transfer by other designated logical channel which is set to be a transfer starting condition for the logical channel in question, specifying said designated other logical channel to be monitored, and the steps of said data link layer of:

monitoring the completion of transfer by said logical channel having said activation bit recorded in said descriptor to determine fulfillment of said transfer starting condition for said other logical channel designated upon the completion of the transfer, and temporarily stopping transfer by said logical channel having said number of logical channel to be monitored recorded in said descriptor and monitoring the completion of transfer by a logical channel indicated by said number of logical channel to be monitored to determine fulfillment of said transfer starting condition for the logical channel in question upon the completion of the transfer.

40. The method of controlling a communication control system as set forth in claim 29, comprising:

the step of recording in said descriptor a stop bit indicating that transfer by the logical channel in question is not to be executed immediately but to be started on condition that transfer by other logical channel designated is completed, the step of recording in said descriptor an activation bit indicating that completion of transfer by the logical channel in question is set to be a transfer starting condition for other logical channel designated, the step of recording in said descriptor a number of logical channel to be monitored for, in order to monitor the completion of transfer by other designated logical channel which is set to be a transfer starting condition for the logical channel in question, specifying said designated other logical channel to be monitored, and the steps of said data link layer of:
temporarily stopping transfer processing by said logical channel having said stop bit recorded in said descriptor to wait for said transfer starting condition to be fulfilled,
monitoring the completion of transfer by said logical channel having said activation bit recorded in said descriptor to determine fulfillment of said transfer starting condition for said other logical channel designated upon the completion of the transfer, and
temporarily stopping transfer by said logical channel having said number of logical channel to be monitored recorded in said descriptor and monitoring the completion of transfer by a logical channel indicated by said number of logical channel to be monitored to determine fulfillment of said transfer starting condition for the logical channel in question upon the completion of the transfer.

41. The method of controlling a communication control system as set forth in claim 29, comprising:
the step of recording in said descriptor an identification value and a monitoring identification value as numerical data, and
the step of said data link layer of comparing, at the time of determination of said transfer starting condition, a value of said monitoring identification value of said descriptor of a waiting logical channel which is a logical channel on the side waiting for said transfer starting condition to be fulfilled and a value of said identification value of a preceding logical channel which is a logical channel on the side which conducts transfer prior to said waiting logical channel and whose transfer completion is said transfer starting condition for said waiting logical channel to determine fulfillment of said transfer starting condition only when the value of said monitoring identification value and the value of said identification value are equal.

42. The method of controlling a communication control system as set forth in claim 29, comprising:
the step of recording in said descriptor a stop bit indicating that transfer by the logical channel in question is not to be executed immediately but to be started on condition that transfer by other logical channel designated is completed,
the step of recording in said descriptor an identification value and a monitoring identification value as numerical data, and
the steps of said data link layer of:
temporarily stopping transfer processing by said logical channel having said stop bit recorded in said descriptor to wait for said transfer starting condition to be fulfilled, and
comparing, at the time of determination of said transfer starting condition, a value of said monitoring identification value of said descriptor of a waiting logical channel which is a logical channel on the side waiting for said transfer starting condition to be fulfilled and a value of said identification value of a preceding logical channel which is a logical channel on the side which conducts transfer prior to said waiting logical channel and whose transfer completion is said transfer starting condition for said waiting logical channel to determine fulfillment of said transfer starting condition only when the value of said monitoring identification value and the value of said identification value are equal.

43. The method of controlling a communication control system as set forth in claim 29, comprising:
the step of recording in said descriptor an activation bit indicating that completion of transfer by the logical channel in question is set to be a transfer starting condition for other logical channel designated,
the step of recording in said descriptor an identification value and a monitoring identification value as numerical data, and
the steps of said data link layer of:
monitoring the completion of transfer by said logical channel having said activation bit recorded in said descriptor to determine fulfillment of said transfer starting condition for said other logical channel designated upon the completion of the transfer, and
comparing, at the time of determination of said transfer starting condition, a value of said monitoring identification value of said descriptor of a waiting logical channel which is a logical channel on the side waiting for said transfer starting condition to be fulfilled and a value of said identification value of a preceding logical channel which is a logical channel on the side which conducts transfer prior to said waiting logical channel and whose transfer completion is said transfer starting condition for said waiting logical channel to determine fulfillment of said transfer starting condition only when the value of said monitoring identification value and the value of said identification value are equal.

44. The method of controlling a communication control system as set forth in claim 29, comprising:
the step of recording in said descriptor a stop bit indicating that transfer by the logical channel in question is not to be executed immediately but to be started on condition that transfer by other logical channel designated is completed,
the step of recording in said descriptor an activation bit indicating that completion of transfer by the logical channel in question is set to be a transfer starting condition for other logical channel designated,
the step of recording in said descriptor an identification value and a monitoring identification value as numerical data, and
the steps of said data link layer of:
temporarily stopping transfer processing by said logical channel having said stop bit recorded in said descriptor to wait for said transfer starting condition to be fulfilled,
monitoring the completion of transfer by said logical channel having said activation bit recorded in said descriptor to determine fulfillment of said transfer starting condition for said other logical channel designated upon the completion of the transfer, and
comparing, at the time of determination of said transfer starting condition, a value of said monitoring identification value of said descriptor of a waiting logical channel which is a logical channel on the side waiting for said transfer starting condition to be fulfilled and a value of said identification value of a preceding logical channel which is a logical channel on the side which conducts transfer prior to said waiting logical channel and whose transfer completion is said transfer starting condition for said waiting logical channel to determine fulfillment of said transfer starting condition only when the value of said monitoring identification value and the value of said identification value are equal.

45. The method of controlling a communication control system as set forth in claim 29, wherein data transfer is completed when a management layer confirms the data transfer.

46. The method of controlling a communication control system as set forth in claim 29, wherein
  a management layer designates a logical channel to transfer said descriptor to the data link layer,
  said data link layer analyzes said descriptor, sets up an appropriate packet and outputs a message and data to a physical layer to execute data transfer to a node of a third party, and
  the management layer confirms the data transfer to complete the transfer.

47. The method of controlling a communication control system as set forth in claim 29, wherein the information recorded in said descriptor also includes a number of a logical channel used to transfer said descriptor from a management layer to said data link layer.

48. A computer readable memory storing a control program of a communication control system having a data link layer which executes data transfer on a logical channel for controlling packet transfer conducted by a plurality of said logical channels between nodes,
  said control program comprising:
  the step of recording, in a descriptor for recording information regarding transfer by each logical channel, information including information regarding an order of transfer by each said logical channel, and
  the step of said data link layer of executing data transfer by each said logical channel based on the information recorded in said descriptor including the information regarding the order of transfer by each said logical channel designated by said descriptor.

49. The computer readable memory storing a control program of a communication control system as set forth in claim 48,
  said control program further comprising:
  the step of recording in said descriptor a stop bit indicating that transfer by the logical channel in question is not to be executed immediately but to be started on condition that transfer by other logical channel designated is completed, and
  the step of said data link layer of temporarily stopping transfer processing by said logical channel having said stop bit recorded in said descriptor to wait for said transfer starting condition to be fulfilled.

50. The computer readable memory storing a control program of a communication control system as set forth in claim 48,
  said control program further comprising:
  the step of recording in said descriptor an activation bit indicating that completion of transfer by the logical channel in question is set to be a transfer starting condition for other logical channel designated, and
  the step of said data link layer of monitoring the completion of transfer by said logical channel having said activation bit recorded in said descriptor to determine fulfillment of said transfer starting condition for said other logical channel designated upon the completion of the transfer.

51. The computer readable memory storing a control program of a communication control system as set forth in claim 48,
  said control program further comprising:
  the step of recording in said descriptor a number of logical channel to be activated for specifying other designated logical channel having the completion of transfer by the logical channel in question set to be a transfer starting condition, and
  the step of said data link layer of monitoring the completion of transfer by said logical channel having said number of logical channel to be activated recorded in said descriptor to determine fulfillment of said transfer starting condition for a logical channel indicated by said number of logical channel to be activated upon the completion of the transfer of said logical channel.

52. The computer readable memory storing a control program of a communication control system as set forth in claim 48,
  said control program comprising:
  the step of recording in said descriptor a number of logical channel to be monitored for, in order to monitor the completion of transfer by other designated logical channel which is set to be a transfer starting condition for the logical channel in question, specifying said designated other logical channel to be monitored, and
  the step of said data link layer of temporarily stopping transfer by said logical channel having said number of logical channel to be monitored recorded in said descriptor and monitoring the completion of transfer by a logical channel indicated by said number of logical channel to be monitored to determine fulfillment of said transfer starting condition for the logical channel in question upon the completion of the transfer.

53. The computer readable memory storing a control program of a communication control system as set forth in claim 48,
  said control program comprising:
  the step of recording in said descriptor an identification value and a monitoring identification value as numerical data, and
  the step of said data link layer of comparing, at the time of determination of said transfer starting condition, a value of said monitoring identification value of said descriptor of a waiting logical channel which is a logical channel on the side waiting for said transfer starting condition to be fulfilled and a value of said identification value of a preceding logical channel which is a logical channel on the side which conducts transfer prior to said waiting logical channel and whose transfer completion is said transfer starting condition for said waiting logical channel to determine fulfillment of said transfer starting condition only when the value of said monitoring identification value and the value of said identification value are equal.

54. The computer readable memory storing a control program of a communication control system as set forth in claim 48, wherein data transfer is completed when a management layer confirms the data transfer.

55. The computer readable memory storing a control program of a communication control system as set forth in claim 48, wherein
  a management layer designates a logical channel to transfer said descriptor to the data link layer,
  said data link layer analyzes said descriptor, sets up an appropriate packet and outputs a message and data to a physical layer to execute data transfer to a node of a third party, and
  the management layer confirms the data transfer to complete the transfer.

56. The computer readable memory storing a control program of a communication control system as set forth in claim 48, wherein the information recorded in said descriptor also includes a number of a logical channel used to transfer said descriptor from a management layer to said data link layer.

* * * * *